US012220650B2

(12) United States Patent
Zhang et al.

(10) Patent No.: US 12,220,650 B2
(45) Date of Patent: *Feb. 11, 2025

(54) REMOTE CONTROL

(71) Applicant: AUTEL ROBOTICS CO., LTD., Shenzhen (CN)

(72) Inventors: Huihua Zhang, Guangdong (CN); Zhiying Liang, Guangdong (CN)

(73) Assignee: AUTEL ROBOTICS CO., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/494,335

(22) Filed: Oct. 25, 2023

(65) Prior Publication Data

US 2024/0058717 A1  Feb. 22, 2024

Related U.S. Application Data

(63) Continuation of application No. 18/179,461, filed on Mar. 7, 2023, now Pat. No. 11,833,442, which is a (Continued)

(30) Foreign Application Priority Data

Sep. 5, 2017 (CN) .......................... 201710792701.7

(51) Int. Cl.
*G06F 17/00* (2019.01)
*A63H 30/04* (2006.01)
(Continued)

(52) U.S. Cl.
CPC ......... *A63H 30/04* (2013.01); *G05G 9/04796* (2013.01); *G05G 9/06* (2013.01); (Continued)

(58) Field of Classification Search
CPC ...... A63H 30/04; G05G 9/04796; G05G 9/06; G05G 2009/04744; G05G 2009/04777; G05G 9/04; G08C 17/02; A63F 13/24
(Continued)

(56) References Cited

U.S. PATENT DOCUMENTS 9,009,747 B2 * 4/2015 Miller, IV ............. A63F 13/428
725/12
9,081,426 B2 * 7/2015 Armstrong .............. G06F 3/016
(Continued)

FOREIGN PATENT DOCUMENTS

| CN | 102147671 B | * | 6/2015 | ........... G06F 3/0346 |
| CN | 106155046 A | * | 11/2016 | ............... G05D 1/00 |

(Continued)

OTHER PUBLICATIONS

VR Remote Manual instruction (Year: 2019).*

*Primary Examiner* — Ronnie M Mancho

(57) ABSTRACT

A remote control includes a body, a first rocker device, a second rocker device, a processor, and a signal transmission device. The first rocker device and the second rocker device are installed on the body. The processor connects to the first rocker device, the second rocker device, and the signal transmission device. The first rocker device includes a joystick component. The second rocker device includes a second joystick component. When the first joystick component moves in parallel relative to the body, the processor generates a remote control instruction used to control a movable object to move in a horizontal plane. When the second joystick component moves straightly relative to the body along a first direction or a second direction, the processor generates a remote control instruction used to control the movable object to move upward or move downward in a vertical direction of the movable object.

19 Claims, 27 Drawing Sheets

Related U.S. Application Data continuation of application No. 16/810,632, filed on Mar. 5, 2020, now Pat. No. 11,623,157, which is a continuation of application No. PCT/CN2018/082217, filed on Apr. 8, 2018.

(51) Int. Cl.
  *G05G 9/047* (2006.01)
  *G05G 9/06* (2006.01)
  *G08C 17/02* (2006.01)

(52) U.S. Cl.
  CPC ... *G08C 17/02* (2013.01); *G05G 2009/04744* (2013.01); *G05G 2009/04777* (2013.01)

(58) Field of Classification Search
  USPC ........................................................ 446/454
  See application file for complete search history.

(56) References Cited

U.S. PATENT DOCUMENTS

| | | | | |
|---|---|---|---|---|
| 9,946,256 | B1 * | 4/2018 | Yui | G08C 17/02 |
| 10,086,282 | B2 * | 10/2018 | Mao | A63F 13/212 |
| 10,684,640 | B2 * | 6/2020 | Liang | G05D 1/0016 |
| 2006/0274032 | A1 * | 12/2006 | Mao | A63F 13/428 |
| | | | | 345/156 |
| 2008/0174550 | A1 * | 7/2008 | Laurila | A63F 13/285 |
| | | | | 345/158 |
| 2011/0195783 | A1 * | 8/2011 | Miyazaki | G06F 3/0346 |
| | | | | 463/37 |
| 2012/0200491 | A1 * | 8/2012 | Miller, IV | G06F 3/0346 |
| | | | | 345/156 |
| 2018/0174783 | A1 * | 6/2018 | Wu | G05G 9/047 |
| 2019/0113947 | A1 * | 4/2019 | Liang | A63F 13/98 |
| 2020/0192346 | A1 * | 6/2020 | Zhang | G05D 1/0016 |
| 2020/0197826 | A1 * | 6/2020 | Zhang | A63H 30/04 |
| 2020/0333823 | A1 * | 10/2020 | Liang | G05G 5/04 |
| 2020/0387187 | A1 * | 12/2020 | Liang | G06F 1/169 |

FOREIGN PATENT DOCUMENTS

| | | | | |
|---|---|---|---|---|
| CN | 107510945 A | * | 12/2017 | A63H 30/04 |
| CN | 109420345 A | * | 3/2019 | A63F 13/24 |
| CN | 109427502 A | * | 3/2019 | B64C 39/024 |
| CN | 109416577 B | * | 12/2021 | A63F 13/211 |
| EP | 3677983 A1 | * | 7/2020 | A63F 13/24 |
| WO | WO-2016045018 A1 | * | 3/2016 | A63H 30/04 |
| WO | WO-2018003161 A1 | * | 1/2018 | A63F 13/211 |

* cited by examiner

REMOTE CONTROL

CROSS-REFERENCE TO RELATED APPLICATIONS

This application is a continuation application of U.S. patent application Ser. No. 18/179,461, Which is a continuation application of U.S. patent application Ser. No. 16/810,632, filed on Mar. 5, 2020, which is a continuation application of International Application No. PCT/CN2018/082217, filed on Apr. 8, 2018, which claims priority of Chinese Patent Application No. 201710792701.7, filed on Sep. 5, 2017, both of which are hereby incorporated by reference in its entirety.

BACKGROUND

Currently, remote control technologies are used in more electronic products such as an unmanned aerial vehicle, a model airplane, and an electronic toy, that is, a remote control is used to operate.

The remote control is basically provided with a rocker device, but there is no visual correspondence between the operation of the rocker device and the actual movement of a remotely controlled movable object, the operation is complex, and the user experience is poor.

SUMMARY

The present invention relates to the field of remote control technologies, and in particular, to a remote control having a rocker device.

To resolve the foregoing technical problem, embodiments of the present invention provide a remote control that is easy to operate.

The embodiments of the present invention resolve the technical problem by using the following technical solutions:

A remote control, configured to remotely control a movable object, where the remote control includes:
  a body;
  a first rocker device being installed on the body, where the first rocker device includes a first joystick component, and the first joystick component can move in parallel relative to the body;
  a second rocker device being installed on the body, wherein the second rocker device comprises a second joystick component; and
  a processor, where the processor is connected to the first rocker device and the second rocker device; where
  when the first joystick component moves in parallel relative to the body, the processor generates a remote control instruction, where the remote control instruction is used to control the movable object to move in a horizontal plane of the movable object; and
  when the second joystick component moves straightly relative to the body along a first direction or a second direction, the processor generates a remote control instruction used to control the movable object to move upward or move downward in a vertical direction of the movable object.

The remote control a signal transmission device, where the signal transmission device is connected to the processor, and configured to receive the remote control instruction generated by the processor, and send the remote control instruction to the movable object.

Optionally, when the first joystick component of the first rocker device moves in parallel relative to the body, any two points on the first joystick component move in a same direction and move by a same distance.

Optionally, when the first joystick component moves in parallel relative to the body, the first joystick component does not rotate.

Optionally, the remote control instruction is used to control the movable object to move in the horizontal plane along a direction corresponding to the direction in which the first joystick component moves.

Optionally, the first rocker device further includes:
  a first shell, where the first shell is fixedly installed on the body of the remote control, and when the first joystick component moves in parallel relative to the body, the first joystick component also moves in parallel relative to the first shell;
  a first magnetic element, where the first magnetic element is installed on the first joystick component; and
  a first circuit board, including a first magnetic sensor, where the first magnetic sensor is configured to sense a magnetic field change of the first magnetic element, where
  when the first joystick component moves in parallel relative to the first shell, the first magnetic element is driven by the first joystick component to move relative to the first magnetic sensor in a plane along any direction.

Optionally, the first joystick component and the plane intersect.

Optionally, the first magnetic sensor sends information indicating the magnetic field change to the processor, and the processor generates the remote control instruction according to the magnetic field change.

Optionally, the first shell is fixedly installed on the body of the remote control by using screws.

Optionally, the first magnetic element is fixedly installed on the first joystick component, and when the first joystick component moves in parallel relative to the first shell, the first magnetic element moves in parallel relative to the first magnetic sensor.

Optionally, the first rocker device further includes a restoring mechanism, where
  when the first joystick component is deviated from an initial position, the restoring mechanism generates a force that restores the first joystick component to the initial position.

Optionally, the restoring mechanism includes a first restoring component and a second restoring component, where
  when the first joystick component is deviated from the initial position, the first restoring component and the second restoring component generate a composite force that restores the first joystick component to the initial position.

Optionally, the first restoring component can generate a force that pushes the first joystick component along a first axis, and the second restoring component can generate a force that pushes the first joystick component along a second axis; and
  when the first joystick component is deviated from the initial position, at least one of the first restoring component and the second restoring component generates a force that pushes the first joystick component along a corresponding axis, so that after the first joystick component is loosened, the first joystick component is restored to the initial position, where the first axis is not parallel to the second axis.

Optionally, the first axis is perpendicular to the second axis.

Optionally, when the first joystick component moves in parallel relative to the body along a positive direction of the first axis, the movable object is controlled to move to the right side in the horizontal plane;

when the first joystick component moves in parallel relative to the body along a negative direction of the first axis, the movable object is controlled to move to the left side in the horizontal plane;

when the first joystick component moves in parallel relative to the body along a positive direction of the second axis, the movable object is controlled to move to the front side in the horizontal plane; and when the first joystick component moves in parallel relative to the body along a negative direction of the second axis, the movable object is controlled to move to the back side in the horizontal plane.

Optionally, the first restoring component includes a first active block, a first elastic element, and a first installation seat, and the first active block is installed on the first installation seat.

Optionally, the quantity of the first active blocks is two; the quantity of the first elastic elements is two; and the first installation seat is provided with a first accommodating groove;

the first accommodating groove is disposed along the first axis, and the two first active blocks are accommodated in the first accommodating groove, and disposed at two relative sides of the first joystick component along the first axis; and one end of either of the first elastic elements is connected to an inner side wall of the first accommodating groove, and the other end of either of the first elastic elements is connected to a corresponding first active block.

Optionally, either of the first active blocks includes a first fixing portion;

two relative sides of the inner side wall of the first accommodating groove are separately disposed with a second fixing portion; and one end of either of the first elastic elements is installed on the second fixing portion of the first accommodating groove, and the other end of either of the first elastic elements is installed on the first fixing portion of a corresponding first active block.

Optionally, the first fixing portion and the second fixing portion are any one of the following: a fixing portion, a slot, and a hooked protrusion.

Optionally, the first accommodating groove is further disposed with a first limiting column, the first limiting column is disposed between the two first active blocks, and the two first active blocks are spaced with a preset distance.

Optionally, the second restoring component includes a second active block, a second elastic element, and a second installation seat, and the second active block is installed on the second installation seat.

Optionally, the quantity of the second active blocks is two; the quantity of the second elastic elements is two; and the second installation seat is provided with a second accommodating groove;

the second accommodating groove is disposed along the second axis, and the two second active blocks are accommodated in the second accommodating groove, and disposed at two relative sides of the first joystick component along the second axis; and one end of either of the second elastic elements is connected to an inner side wall of the second accommodating groove, and the other end of either of the second elastic elements is connected to a corresponding second active block.

Optionally, either of the second active blocks includes a third fixing portion;

two relative sides of the inner side wall of the second accommodating groove are separately disposed with a fourth fixing portion; and one end of either of the second elastic elements is installed on the fourth fixing portion of the second accommodating groove, and the other end of either of the second elastic elements is installed on the third fixing portion of a corresponding second active block.

Optionally, the third fixing portion and the fourth fixing portion are any one of the following: a fixing portion, a slot, and a hooked protrusion.

Optionally, the second accommodating groove is further disposed with a second limiting column, the second limiting column is disposed between the two second active blocks, and the two second active blocks are spaced with a preset distance.

Optionally, the first shell is provided with a first through hole, and the first through hole is a reserved moving space for the first joystick component to move in parallel relative to the body and move in parallel relative to the first shell.

Optionally, the first shell is further disposed with a circular limiting portion, the first joystick component includes a sliding portion, and when the first joystick component moves in parallel relative to the first shell to a position, the sliding portion is abutted against the circular limiting portion, to limit a moving range of the first joystick component to a space limited by the circular limiting portion.

Optionally, the first shell of the first rocker device includes a first shell portion and a second shell portion, and the first shell portion and the second shell portion are buckled with each other, and form a first cavity; and the first joystick component is partially accommodated in the first cavity, and both the first magnetic element and the first circuit board are accommodated in the first cavity.

Optionally, the first shell portion and the second shell portion separately include a bottom wall, and a side wall extending from an outer edge of the bottom wall.

Optionally, the first magnetic sensor is a Hall element or a magnetic encoder.

Optionally, the remote control further includes:

a second rocker device, installed on the body and connected to the processor, where the second rocker device includes a second joystick component, and the second joystick component can move relative to the body, where when the second joystick component moves relative to the body, the processor (410) generates a remote control instruction used to control the movable object to move correspondingly.

Optionally, when the second joystick component moves relative to the body, the remote control instruction generated by the processor is used to control the movable object to move upward or move downward in a vertical direction, or rotate along a clockwise direction or an anticlockwise direction in a horizontal plane.

Optionally, the second joystick component swings or rotates or moves in parallel or moves straightly relative to the body.

Optionally, when the second joystick component swings relative to the body, the remote control instruction generated by the processor is used to control the movable object to move upward or move downward in a vertical direction, or rotate along a clockwise direction or an anticlockwise direction in a horizontal plane.

Optionally, when the second joystick component moves in parallel relative to the body, the processor generates a remote control instruction used to control the movable object to move upward or move downward in a vertical direction; and when the second joystick component rotates relative to the body, the processor generates a remote control instruction used to control the movable object to rotate along a clockwise direction or an anticlockwise direction in a horizontal plane.

Optionally, when the second joystick component moves straightly relative to the body along a first direction or a second direction, the processor generates a remote control instruction used to control the movable object to move upward or move downward in a vertical direction;

when the second joystick component rotates relative to the body, the processor generates a remote control instruction used to control the movable object to rotate along a clockwise direction or an anticlockwise direction in a horizontal plane; and the first direction is opposite to the second direction.

Optionally, the movable object is an unmanned aerial vehicle.

BRIEF DESCRIPTION OF THE DRAWINGS

One or more embodiments are described exemplarily by using the figures in the corresponding accompanying drawings. These exemplary descriptions do not constitute limitations to the embodiments, and elements with same reference numbers in the accompanying drawings represent similar elements. Unless otherwise specified, the figures in the accompanying drawings do not constitute a proportional limitation.

DETAILED DESCRIPTION

To help understand the present invention, the following describes the present invention in further detail with reference to the accompanying drawings and specific implementations. It should be noted that, when an element is expressed as "fixed on" another element, the element may be directly on the another element, or one or more middle elements may exist between the another element. When one element is expressed as "electrically connected to" another element, the element may be directly connected to the another element, or one or more middle elements may exist between the another element. Orientation or position relationships indicated by the terms "upper", "lower", "inner", "outer", and "bottom" used in this specification are based on the orientation or position relationships shown in the accompanying drawings, only to help describe the present invention and simplify the description, instead of indicating or implying that the mentioned device or element needs to have a specific orientation, and is constructed and operated in the specific orientation. Therefore, it should not be understood as a limitation to the present invention. In addition, the terms "first", "second", "third", and "fourth" are only used to describe the purpose, instead of being understood as indicating or implying the relative importance.

Unless defined otherwise, all technical and scientific terms used in this specification are the same as the meanings generally understood by a person skilled in the technical field of the present invention. The terms used in the specification of the present invention are only for the purpose of describing specific implementations, instead of being used to limit the present invention. The term "and/or" used in this specification includes any and all combinations of one or more related listed items.

In addition, the technical features involved in the following described different embodiments of the present invention may be combined with each other provided that they do not conflict with each other.

Figure 1:
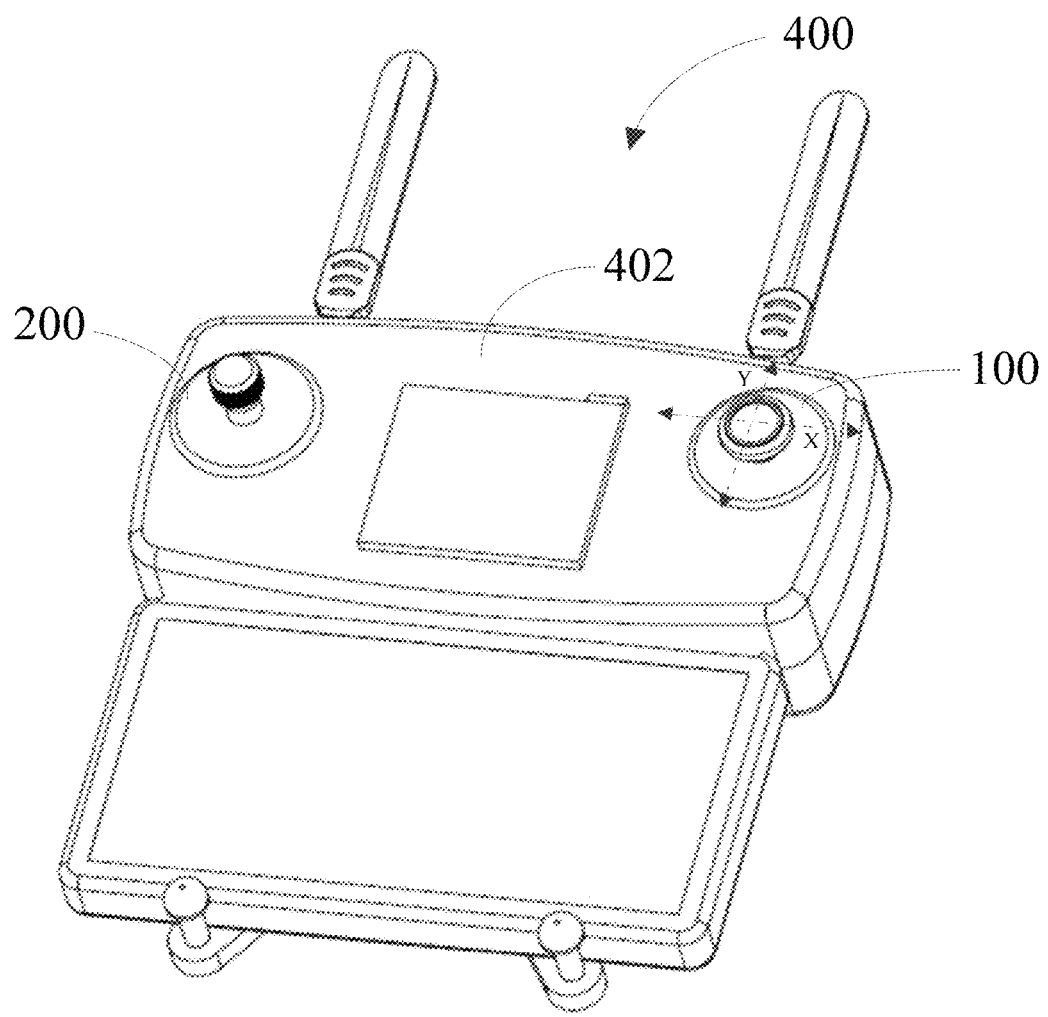
FIG. 1 is a simplified three-dimensional of a remote control according to an embodiment of the present invention.

Referring to FIG. 1, an embodiment of the present invention provides a remote control 400, configured to remotely control a movable object. The movable object may be an unmanned aerial vehicle (UAV), a model airplane, an electronic toy, or the like. The remote control 400 includes a first rocker device 100, a second rocker device 200, and a body 402, and both the first rocker device 100 and the second rocker device 200 are installed on the body 402.

A first joystick component of the first rocker device 100 is configured to move in parallel relative to the body 402, to trigger the remote control 400 to generate a corresponding remote control instruction. Specifically:

when the first joystick component moves in parallel relative to the body 402, the processor 410 generates a remote control instruction, where the remote control instruction is used to control the movable object to move in a horizontal plane of the movable object.

In some embodiments, when the first joystick component of the first rocker device 100 moves in parallel relative to the body 402 along a positive direction of a first axis (the X axis in FIG. 1), the movable object is controlled to move to the right side in the horizontal plane;

when the first joystick component of the first rocker device 100 moves in parallel relative to the body 402 along a negative direction of the first axis, the movable object is controlled to move to the left side in the horizontal plane;

when the first joystick component 20 of the first rocker device 100 moves in parallel relative to the body 402 along a positive direction of a second axis (the Y axis in FIG. 1), the movable object is controlled to move to the front side in the horizontal plane; and when the first joystick component of the first rocker device 100 moves in parallel relative to the body 402 along a negative direction of the second axis, the movable object is controlled to move to the back side in the horizontal plane.

The second joystick component of the second rocker device 200 is configured to move straightly relative to the body 402 along a first direction (that is, the X' direction in FIG. 31) or a second direction (that is, the Y' direction in FIG. 33), and is further configured to rotate along a clockwise direction or an anticlockwise direction, to trigger the remote control 400 to generate a corresponding remote control instruction. Obviously, the first direction is opposite to the second direction. Specifically:

when the second joystick component of the second rocker device 200 moves straightly relative to the body 402 along the first direction, the movable object is controlled to move upward in a vertical direction;

when the second joystick component of the second rocker device 200 moves straightly relative to the body 402 along the second direction, the movable object is controlled to move downward in the vertical direction;

when the second joystick component of the second rocker device 200 rotates relative to the body 402 along a clockwise direction, the movable object is controlled to rotate in a horizontal plane along a clockwise direction; and when the second joystick component of the second rocker device 200 rotates relative to the body 402 along an anticlockwise direction, the movable object is controlled to rotate in the horizontal plane along an anticlockwise direction.

Figure 2:
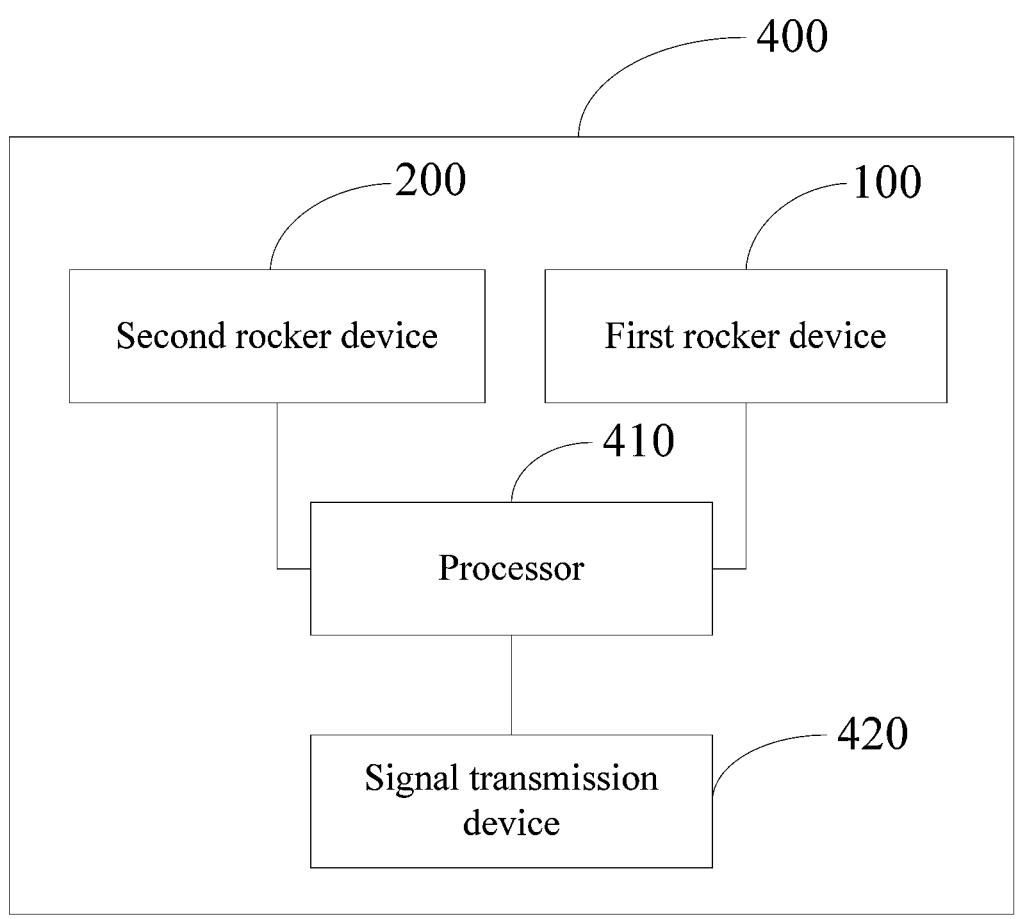
FIG. 2 is a simplified schematic diagram of a functional module of a remote control according to an embodiment of the present invention.

Referring to FIG. 2, the remote control 400 further includes a processor 410 and a signal transmission device 420.

The processor 410 is connected to the first rocker device 100 and the second rocker device 200, and is configured to generate, according to parallel moving of the first joystick component of the first rocker device 100 relative to the body 402 and parallel moving, swinging, rotating, or moving straightly of the second joystick component of the second rocker device 200 relative to the body 402, a remote control instruction used to control the movable object to move correspondingly. The processor 410 may be a general processor, a digital signal processor (DSP), an application specific integrated circuit (ASIC), a field programmable gate array (FPGA), a single chip microcomputer, an ARM (Acorn RISC Machine), or another programmable logic device, a discrete gate or a transistor logic, a discrete hardware component, or any combination of these components.

The signal transmission device 420 is connected to the processor 410, and is configured to receive a remote control instruction generated by the processor 410, and send the remote control instruction to the remotely controlled movable object.

In this embodiment of the present invention, the first rocker device 100 is used by a right hand of a user to operate, and the second rocker device 200 is used by a left hand of a user to operate. It may be understood that, in some other embodiments, positions of the first rocker device 100 and the second rocker device 200 may be exchanged according to using habits of a user.

In addition, it should be noted that, a "swing" rocker device is used on a conventional remote control. The "swing" means that when the rocker device is being controlled, a joystick component of the rocker device generates, by swinging relative to a point on a rod body of the joystick component, a remote control instruction used to control a remotely controlled movable object to move correspondingly. Relative to a conventional "swing" rocker device, the first rocker device 100 and the second rocker device 200 in the embodiments of the present invention discard the conventional "swing" form, and use a new control (or "parallel movement") form, or a "straight movement" form, or a "rotating" (that is, spinning) form. It should be understood that, when the solutions of the present invention are implemented, the first rocker device 100 and the second rocker device 200 do not need to be used at the same time, but may be used independently. That is, it is unnecessary to use the first rocker device 100 and the second rocker device 200 with the new construction on one remote control at the same time. Instead, the first rocker device 100 or the second rocker device 200 may be combined with the conventional "swing" rocker device, and used on one remote control. That is, the first rocker device 100 in the embodiments of the present invention may be used on a left/right rocker device of the remote control, and the conventional "swing" rocker device may be used on a right/left rocker device; or the second rocker device 200 in the embodiments of the present invention may be used on a left/right rocker device of the remote control, and the conventional "swing" rocker device may be used on a right/left rocker device.

Figure 3:
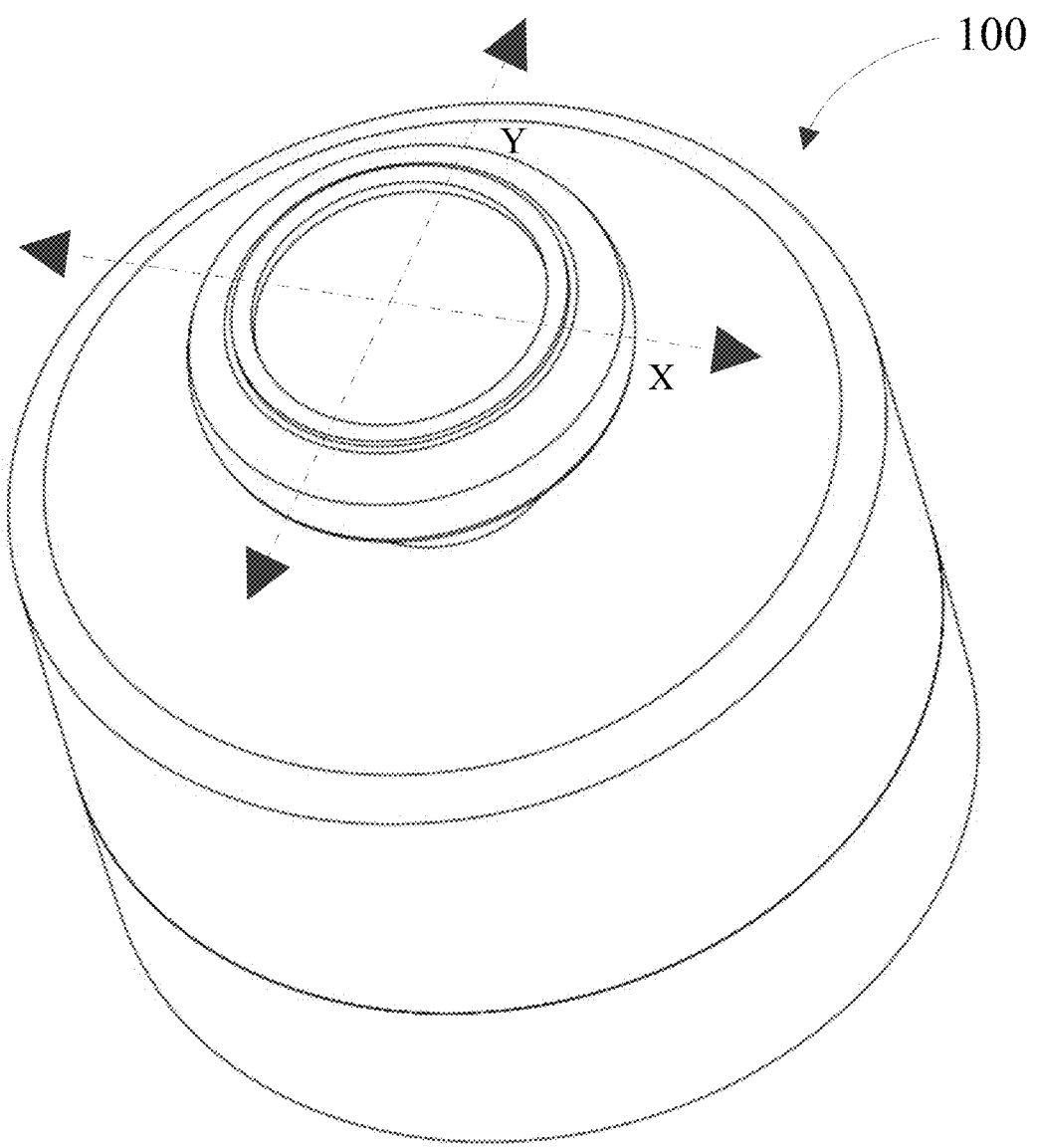
FIG. 3 is a three-dimensional view of a first rocker device of the remote control shown in FIG. 1.
Figure 4:
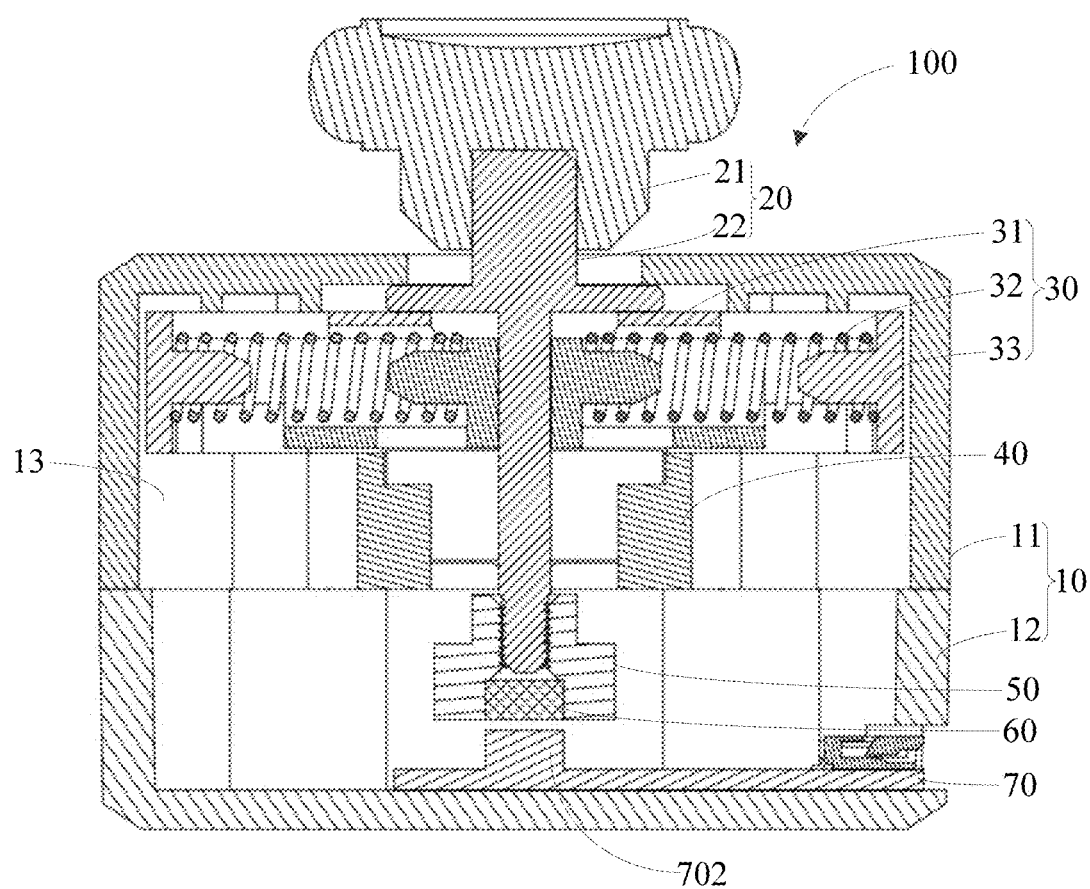
FIG. 4 is a sectional view of the first rocker device shown in FIG. 3.
Figure 5:
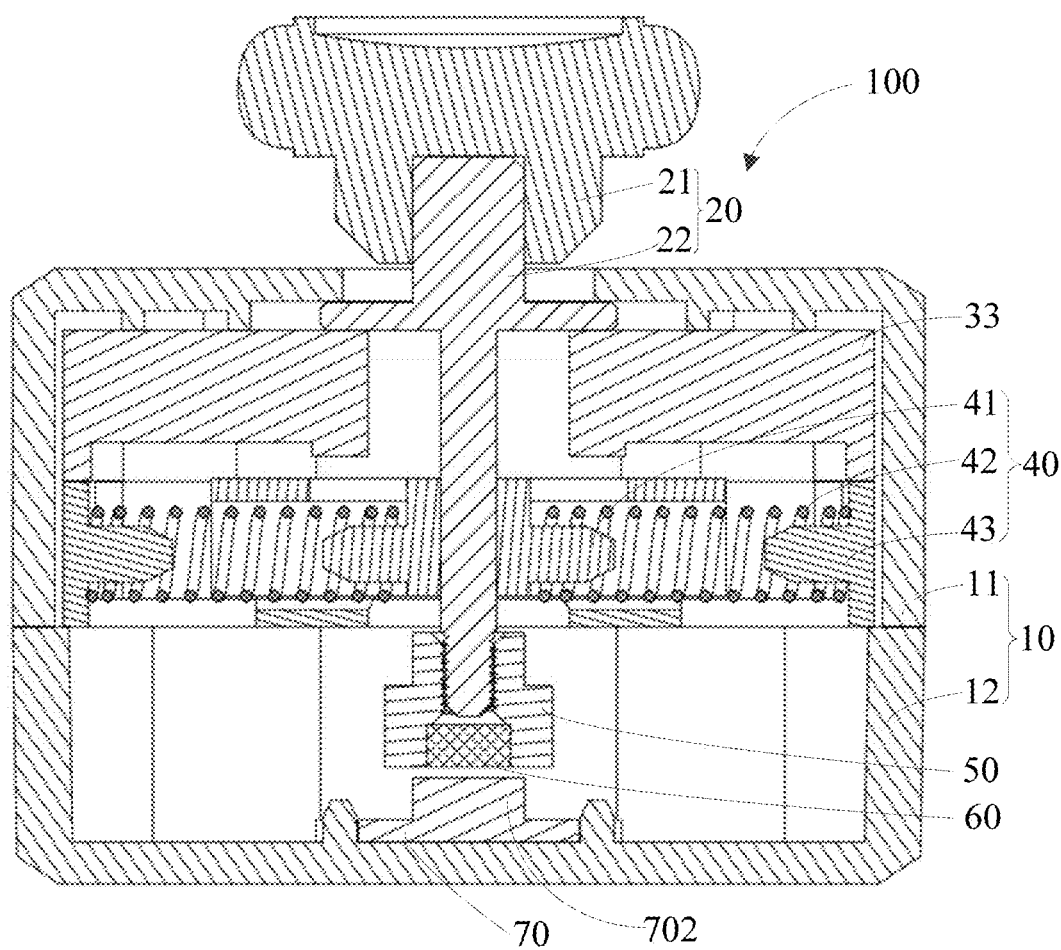
FIG. 5 is a sectional view of another angle of the first rocker device shown in FIG. 3.

Referring to FIG. 3 to FIG. 5, the first rocker device 100 includes a first shell 10, a first joystick component 20, a first restoring component 30, a second restoring component 40, a fixing piece 50, a first magnetic element 60, and a first circuit board 70.

The first joystick component 20 is partially accommodated in the first shell 10, and the first restoring component 30, the second restoring component 40, the fixing piece 50, the first magnetic element 60, and the first circuit board 70 are accommodated in the first shell 10.

One end of the first joystick component 20 is connected to the first magnetic element 60 by using the fixing piece 50, the first joystick component 20 may move in parallel relative to the first shell 10 or the body 402, and the first magnetic element 60 may be driven from an initial position by the first joystick component 20 to move in parallel relative to the first circuit board 70 in a plane. The first circuit board 70 is parallel to the plane, and the first joystick component 20 and the plane intersect.

The "initial position" of the first joystick component 20 in the embodiments of the present invention refers to an original position in a natural state in which the first joystick component 20 is not touched by a user. In a general case, when the first joystick component 20 is in the initial position, a central axis of a first rod body of the first joystick component 20 and a central axis of the first rocker device 100 overlap. The "initial position" of the first magnetic element 60 also refers to an original position of the first magnetic element 60 in a natural state in which the first joystick component 20 is not touched by a user. In a general case, when the first magnetic element 60 is at a central position, a central point penetrates the central axis of the first rocker device 100.

The "parallel movement" in the embodiments of the present invention means that all points on one component move by a same distance according to a direction, and the component does not rotate relative to any point on the component. When the first joystick component 20 moves in parallel relative to the first shell 10 and the body 402, any two points on the first joystick component 20 move in a same direction and move by a same distance, and the first joystick component 20 does not rotate.

The first restoring component 30 and the second restoring component 40 may generate a composite force that restores the first joystick component 20, so that the first magnetic element 60 is restored to the initial position. When neither the first restoring component 30 nor the second restoring component 40 generates an acting force for the first joystick component 20, the first joystick component 20 and the first magnetic element 60 are separately at the initial position.

The first shell 10 is fixedly installed on the body 402 by using screws. The first shell 10 includes a first shell portion 11 and a second shell portion 12, the first shell portion 11 is installed on the second shell portion 12, and a first cavity 13 is formed between the first shell portion 11 and the second shell portion 12. The first shell portion 11 and the second shell portion 12 separately include a bottom wall, and a side wall extending from an outer edge of the bottom wall. The bottom wall and the side wall of the first shell portion 11 and the second shell portion 12 are enclosed to form the first cavity 13.

Figure 6:
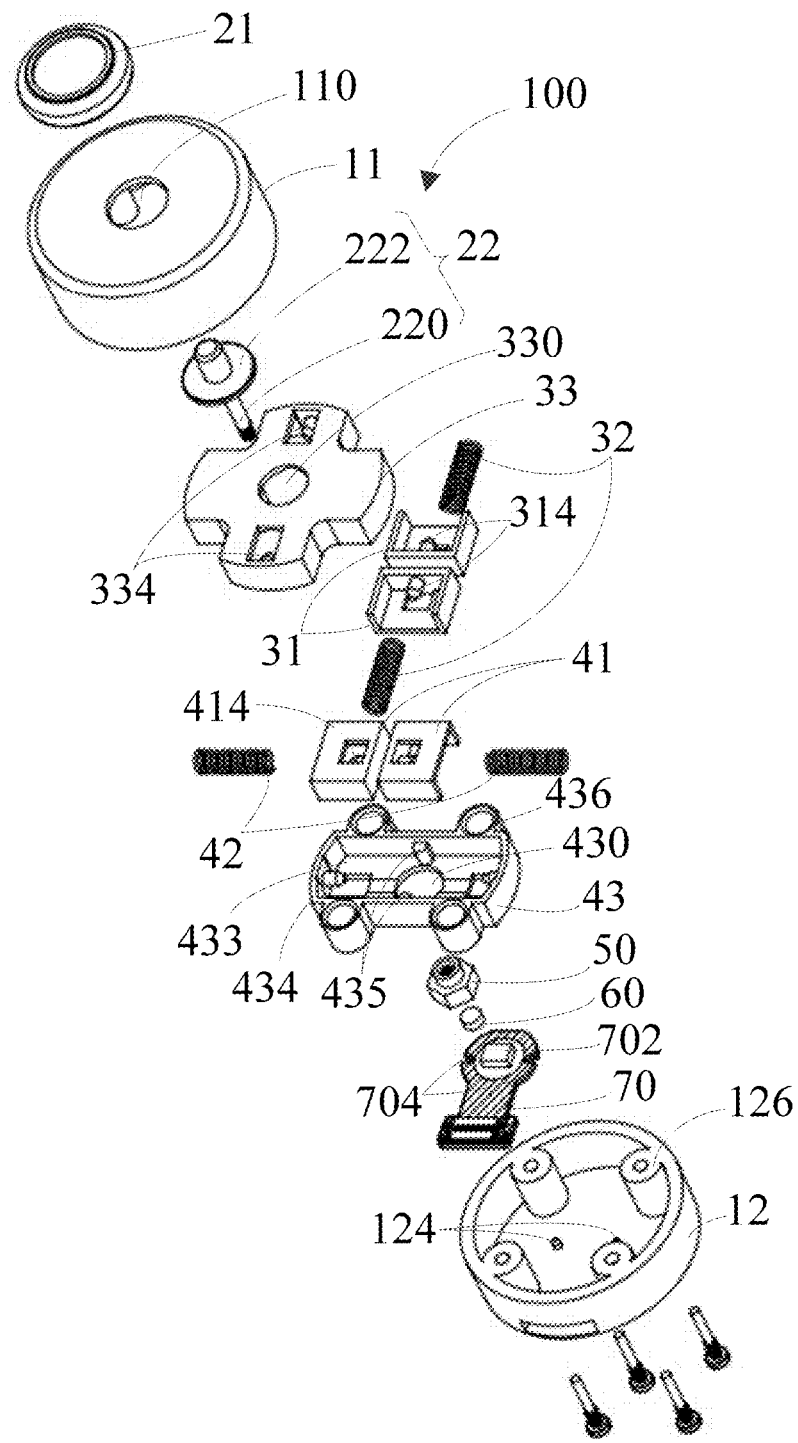
FIG. 6 is an exploded view of the first rocker device shown in FIG. 3.
Figure 7:
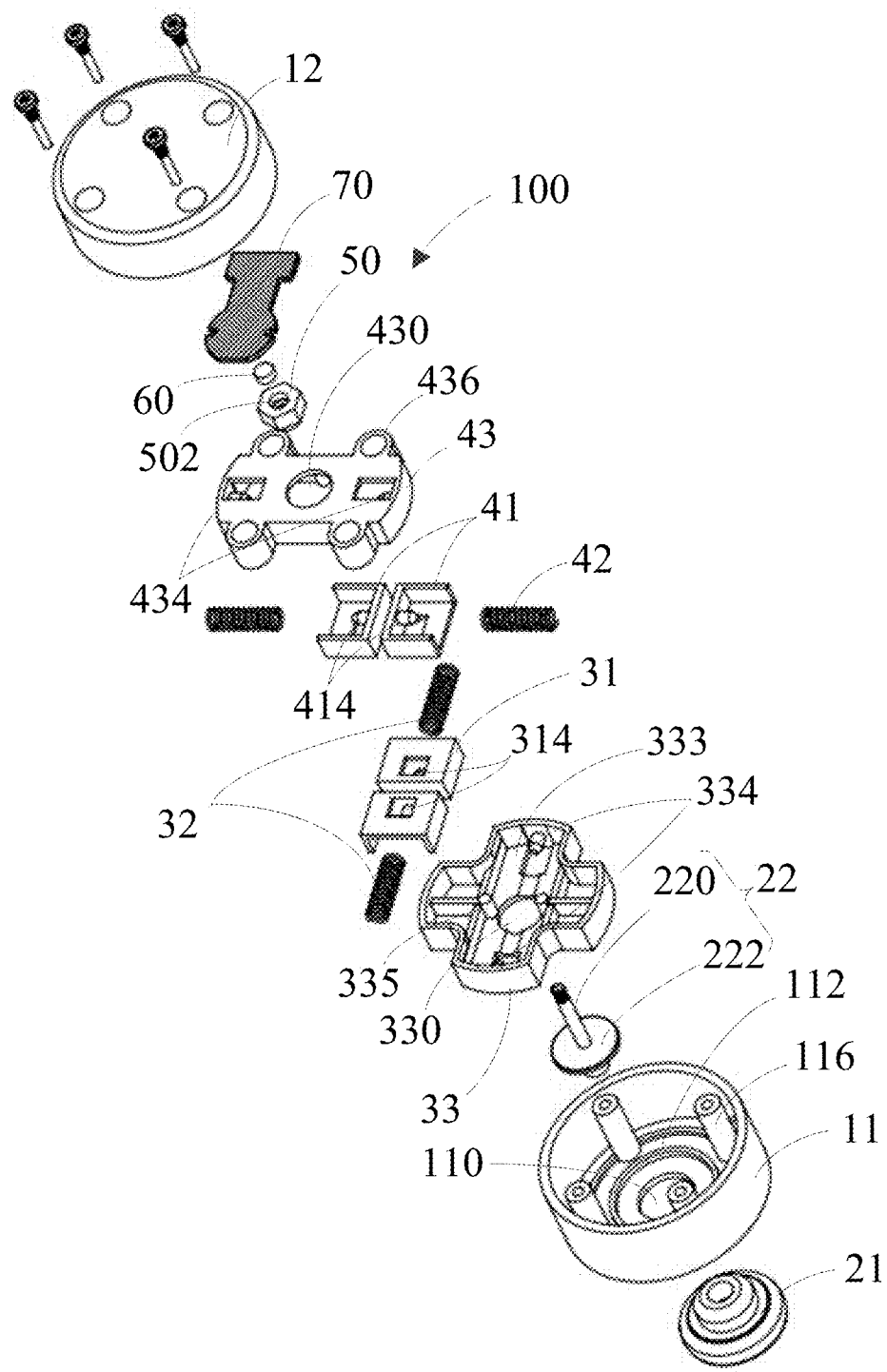
FIG. 7 is an exploded view of another angle of the first rocker device shown in FIG. 3.

Referring to both FIG. 6 and FIG. 7, the first shell portion 11 includes a circular limiting portion 112 and a first installation column 116, the circular limiting portion 112 is disposed on a bottom wall of the first shell portion 11, and multiple first installation columns 116 are extended from the bottom wall of the first shell portion 11. The bottom wall of the first shell portion 11 is provided with a first through hole 110, and a central line of the circular limiting portion 112 and a central line of the first through hole 110 overlap. The first through hole 110 is a reserved moving space for the first joystick component 20 to move in parallel relative to the first shell 10 and the body 402.

The second shell portion 12 includes a location column 124 and a second installation column 126, two location columns 124 are disposed on a bottom wall of the second shell portion 12, and multiple second installation columns 126 are extended from the bottom wall of the first shell portion 11. The quantity of the second installation columns 126 is equal to the quantity of the first installation columns 116, and the position of each of the second installation columns 126 corresponds to the position of a corresponding first installation column 116.

The first joystick component 20 includes an operating handle 21 and a joystick 22. The joystick 22 includes a first rod body 220 and a round sliding portion 222. The first rod body 220 is a cylinder, the round sliding portion 222 is sleeved and fixed on the first rod body 220, one end of the first rod body 220 is fixedly connected to the operating handle 21, and the other end of the first rod body 220 is fixedly connected to the fixing piece 50. In this embodiment, the operating handle 21 and the joystick 22 are separate elements. It may be understood that, in some other embodiments, the operating handle 21 and the joystick 22 may be an integral structure.

The first restoring component 30 includes a first active block 31, a first elastic element 32, and a first installation seat 33.

The quantity of the first active block 31 is two, and each first active block 31 is roughly rectangular and includes a first fixing portion 314.

The quantity of the first elastic elements 32 is two. In this embodiment, the first elastic element 32 is a pressure spring. It may be understood that, in some other embodiments, the first elastic element 32 may be another elastic element that may provide a restoring force.

The first installation seat 33 is a shell, and is provided with a second through hole 330 and a first accommodating groove 333. The second through hole 330 is in communication with the first accommodating groove 333. The second through hole 330 is located at a central part of the bottom wall of the first installation seat 33. Two relative sides of the inner side wall of the first accommodating groove 333 are separately disposed with a second fixing portion 334, and the other two relative sides of the inner side wall of the first accommodating groove 333 are separately disposed with a first limiting column 335.

The two first active blocks 31 are installed on the first accommodating groove 333, and are disposed along the first axis. The two first limiting columns 335 are disposed between the two first active blocks 31, and the two first active blocks 31 are spaced with a preset distance. One end of either of the first elastic elements 32 is installed on a second fixing portion 334 of the first installation seat 33, and the other end of either of the first elastic element 32 is installed on a first fixing portion 314 of the first active block 31, so that each first elastic element 32 is compressed between a first active block 31 and the first installation seat 33. Each first active block 31 may move in the first accommodating groove 333 along the first axis, to compress the connected first elastic element 32, or may be pushed by a restoring force of the connected first elastic element 32 to move in the first accommodating groove 333 along the first axis, until the first active block 31 is abutted against the first limiting column 335.

In this embodiment, both the first fixing portion 314 and the second fixing portion 334 are fixing columns. It may be understood that, in some other embodiments, the first fixing portion 314 and/or the second fixing portion 334 may be a slot or a hooked protrusion, provided that the first fixing portion 314 and/or the second fixing portion 334 may be fixed on one end of the first elastic element 32; or the first fixing portion 314 and the second fixing portion 334 may be omitted, one end of the first elastic element 32 may be directly fixed on the inner side wall of the first accommodating groove 333, and the other end of the first elastic element 32 may be directly fixed on the first active block 31.

It may be understood that, in some other embodiments, the quantity of the first active blocks 31 is not limited to two, and may be one or more.

The second restoring component 40 includes a second active block 41, a second elastic element 42, and a second installation seat 43.

The quantity of the second active blocks 41 is two, and each second active block 41 is roughly rectangular, and includes a third fixing portion 414.

The quantity of the second elastic elements 42 is two. In this embodiment, the second elastic element 42 is a pressure spring. It may be understood that, in some other embodiments, the second elastic element 42 may be another elastic element that may provide a restoring force.

The second installation seat 43 is a shell, and is provided with a third through hole 430 and a second accommodating groove 433. The third through hole 430 is in communication with the second accommodating groove 433. The third through hole 430 is located at a central part of the bottom wall of the second installation seat 43. Two relative sides of the inner side wall of the second accommodating groove 433 are separately disposed with a fourth fixing portion 434, and the other two relative sides of the inner side wall of the second accommodating groove 433 are separately disposed with a second limiting column 435. An outer side wall of the second installation seat 43 is disposed with multiple third installation columns 436.

The two second active blocks 41 are installed in the second accommodating groove 433, and disposed along a second axis. The two second limiting columns 435 are disposed between the two second active blocks 41, and the two second active blocks 41 are spaced with a preset distance. One end of either of the second elastic elements 42 is installed on a fourth fixing portion 434 of the second installation seat 43, and the other end of either of the second elastic elements 42 is installed on a third fixing portion 414 of the second active block 41. Each second elastic element 42 is compressed between a second active block 41 and the second installation seat 43. Each second active block 41 may move in the second accommodating groove 433 along the second axis, to compress the connected second elastic element 42, or may be pushed by a restoring force of the connected second elastic element 42 to move in the second accommodating groove 433 along the second axis, until the second active block 41 is abutted against the second limiting column 435. The first axis and the second axis are perpendicular to each other, and the first axis and the second axis are separately parallel to the plane.

In some other embodiments, the first axis may also not perpendicular to the second axis.

It should be noted that, in the embodiments of the present invention, the first axis and the second axis refer to two virtual straight lines of directions indicated by the dotted lines in FIG. 1. Generally, a plane formed by the first axis and the second axis is roughly parallel to a central plane of the body 402 of the remote control 400. In different embodiments, the first axis and the second axis may be two virtual straight lines indicating any movement direction of the first joystick component 20, provided that the first axis and the second axis are not parallel to each other.

In this embodiment, both the third fixing portion 414 and the fourth fixing portion 434 are fixing columns. It may be understood that, in some other embodiments, the third fixing portion 414 and/or the fourth fixing portion 434 may be a slot or a hooked protrusion, provided that the third fixing portion 414 and/or the fourth fixing portion 434 may be fixed on one end of the second elastic element 42; or the third fixing portion 414 and the fourth fixing portion 434 may be omitted, one end of the second elastic element 42 may be directly fixed on the inner side wall of the second installation seat 43, and the other end of the second elastic element 42 may be directly fixed on the second active block 41.

It may be understood that, in some other embodiments, the quantity of the second active blocks 41 is not limited to two, and may be one or more.

The fixing piece 50 is provided with an accommodating hole 502, and the first magnetic element 60 is accommodated and fixed in the accommodating hole 502. In this embodiment, the fixing piece 50 is a fixing nut.

The first circuit board 70 includes a first magnetic sensor 702, and the first magnetic sensor 702 is faced to the first magnetic element 60. When the first magnetic element 60 is at the initial position, the first magnetic sensor 702 is aligned with the first magnetic element 60. Two relative sides of the first circuit board 70 are separately provided with a location hole 704. In this embodiment, the first magnetic sensor 702 is a Hall element. It may be understood that, in some other embodiments, the first magnetic sensor 702 may be another element that may sense the magnetic field change, for example, a magnetic encoder.

When the first rocker device 100 is being assembled, the joystick 22 penetrates the first through hole 110, and the operating handle 21 is fixedly installed on one end of the joystick 22. The joystick 22 successively penetrates the second through hole 330 and the third through hole 430, and the other end of the joystick 22 is fixedly installed on the fixing piece 50. The two first active blocks 31 are separately disposed on two relative sides of the joystick 22, and the two second active blocks 41 are separately disposed on the other two relative sides of the joystick 22.

The first circuit board 70 is fixedly installed on the bottom wall of the second shell portion 12, and the two location columns 124 are correspondingly accommodated in the location hole 704.

The first restoring component 30 and the second restoring component 40 are placed in the first shell portion 11, and the second shell portion 12 covers the first shell portion 11, so that the first magnetic element 702 is faced to the first magnetic element 60, the second installation column 126 is abutted against the second installation seat 43, and the first installation seat 33 and the second installation seat 43 are clamped between the second installation column 126 and the first shell portion 11. The first installation column 116 is aligned with the second installation column 126 and the third installation column 436.

After successively penetrating the second installation column 126 and the third installation column 436, multiple screws are inserted and fixed in the first installation column 116, the second shell portion 12, the second installation seat 43, the first installation seat 33, and the first shell portion 11 are fixed together, and the round sliding block 222 is accommodated in a gap between the first installation seat 33 and the first shell portion 11.

Figure 8:
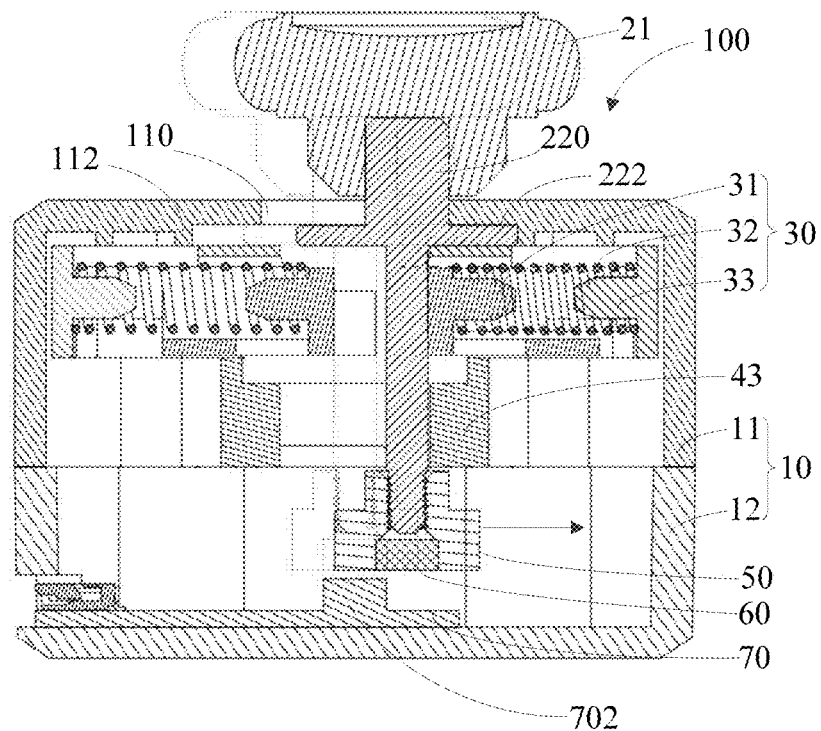
FIG. 8 is a sectional view of the first rocker device shown in FIG. 3, where a first rod body of the first rocker device is pushed to move along a first axis.
Figure 9:
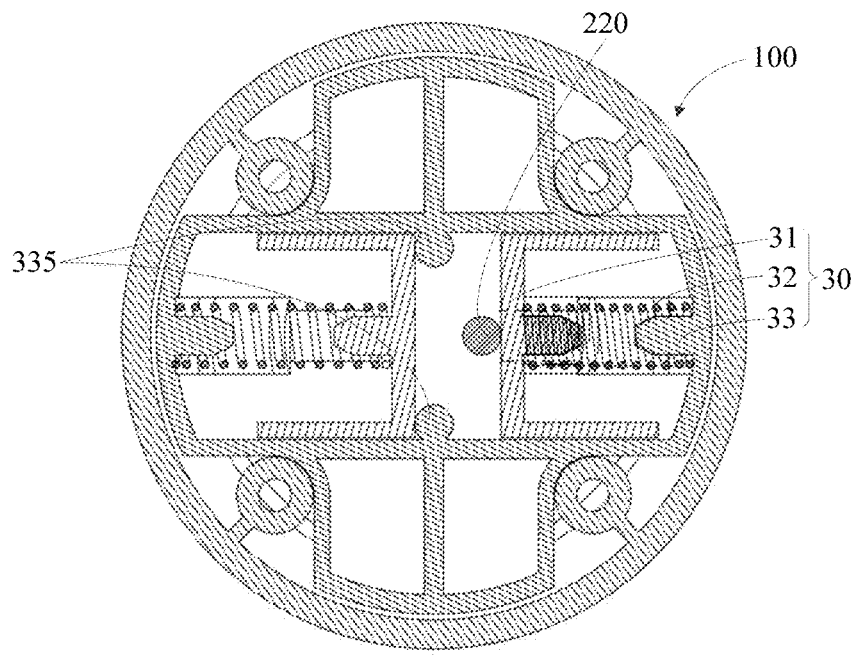
FIG. 9 is a sectional view of another angle of the first rocker device shown in FIG. 3, where a first rod body of the first rocker device is pushed to move along the first axis.

When being used, referring to FIG. 8 and FIG. 9, the first joystick component 20 may be pushed to move in parallel relative to the first shell 10 and the body 402 along the first axis, and one of the first active blocks is pushed by the first rod body 220, so that the first elastic element 32 connected to the pushed first active block 31 is compressed. The first magnetic element 60 is driven from the initial position to move in the plane along the first axis. The first magnetic sensor 702 senses the magnetic field change of the first magnetic element 60, and obtains a moving position of the first magnetic element 60 along the first axis. The processor 410 generates a remote control instruction according to the moving position of the first magnetic element 60 obtained by the first magnetic sensor 702, and the remote control 400 sends the remote control instruction to the remotely controlled movable object, so that the movable object moves in a horizontal plane of the movable object along a direction corresponding to the direction in which the first joystick component 20 moves in parallel.

When the first rod body 220 is abutted against an inner wall of the first through hole 110 and the second installation seat 43, and the round sliding portion 222 is abutted against the circular limiting portion 112, the first joystick component 20 stops moving in parallel along the first axis. It may be understood that, in some other embodiments, according to an actual requirement, only the inner wall of the first through hole 110 or the second installation seat 43 may be selected to be abutted against the first rod body 220, or only the round sliding portion 222 may be selected to be abutted against the circular limiting portion 112, so that the first joystick component 20 stops moving in parallel along the first axis.

After the force that pushes the first joystick component 20 disappears, the compressed first elastic element 32 restores to the original shape, to push the first active block 31 to move along the first axis, so that the first joystick component 20 drives the first magnetic element 60 to restore to the initial position.

Figure 10:
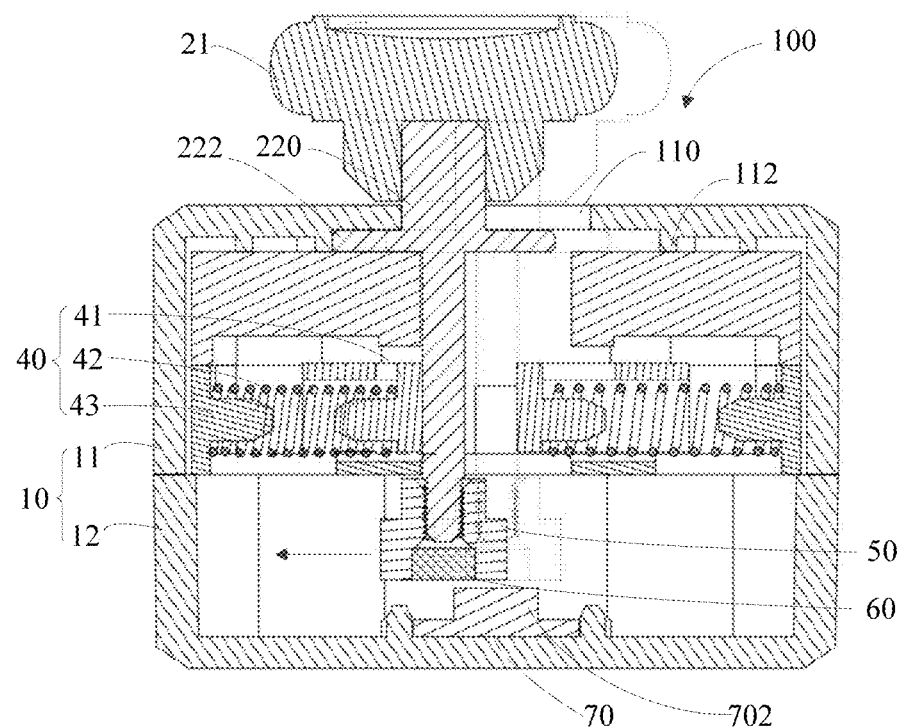
FIG. 10 is a sectional view of the first rocker device shown in FIG. 3, where a first rod body of the first rocker device is pushed to move along a second axis.
Figure 11:
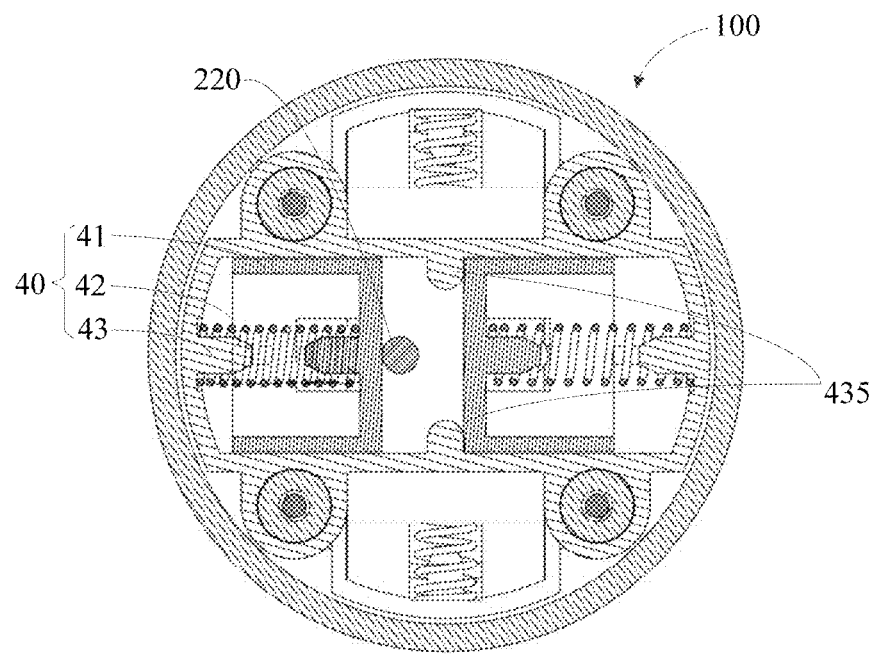
FIG. 11 is a sectional view of another angle of the first rocker device shown in FIG. 3, where a first rod body of the first rocker device is pushed to move along the second axis.

Similarly, referring to FIG. 10 and FIG. 11, the first joystick component 20 may be pushed to move in parallel relative to the first shell 10 and the body 402 along the second axis, and one of the second active blocks 41 is pushed by the first rod body 220, so that the second elastic element 42 connected to the pushed second active block 41 is compressed. The first magnetic element 60 is driven from the initial position to move in the plane along the second axis. The first magnetic sensor 702 senses the magnetic field change of the first magnetic element 60, and obtains a moving position of the first magnetic element 60 along the second axis. The processor 410 generates a remote control instruction according to the moving position of the first magnetic element 60 obtained by the first magnetic sensor 702, and the remote control 400 sends the remote control instruction to the remotely controlled movable object, so that the movable object moves in a horizontal plane of the movable object along a direction corresponding to the direction in which the first joystick component 20 moves in parallel.

When the first rod body 220 is abutted against the inner wall of the first through hole 110 and the first installation seat 33, and the round sliding portion 222 is abutted against the circular limiting portion 112, the first joystick component 20 stops moving along the second axis. It may be understood that, in some other embodiments, according to an actual requirements, only the inner wall of the first through hole 110 or the first installation seat 33 may be selected to be abutted against the first rod body 220, or only the round sliding portion 222 may be selected to be abutted against the circular limiting portion 112, so that the first joystick component 20 stops moving in parallel along the second axis.

After the force that pushes the first joystick component 20 disappears, the compressed second elastic element 42 restores to the original shape, to push the second active block 41 to move along the second axis, so that the first joystick component 20 drives the first magnetic element 60 to restore to the initial position.

It may be understood that, when the first joystick component 20 moves in parallel relative to the first shell 10 and the body 402 along any direction, the first restoring component 30 and the second restoring component 40 may generate a composite force to restore the first joystick component 20, so that the first joystick component 20 and the first magnetic element 60 on the first joystick component 20 are restored to the initial position. That is, when an external force applied to the first joystick component 20 disappears, the first restoring component 30 and the second restoring component 40 collaborate and cooperate to restore the first joystick component 20 to the initial position.

It should be understood that, the "collaborate" may be understood as including the following two situations.

Situation 1: The first restoring component 30 and the second restoring component 40 separately generate a force used to restore the first joystick component 20, and a composite force of the two forces generated by the first restoring component 30 and the second restoring component 40 restores the first joystick component 20 to the initial position. For example, when the first joystick component 20 moves in parallel relative to the first shell 10 and the body 402 along any other direction except the first axis and the second axis, because the first joystick component 20 displaces relative to the directions of the first axis and the second axis, composite force of the forces generated by the first restoring component 30 and the second restoring component 40 restores the first joystick component 20, so that the first joystick component 20 and the first magnetic element 60 are restored to the initial position.

Situation 2: Only one of the first restoring component 30 and the second restoring component 40 generates a force used to restore the first joystick component 20, and the force restores the first joystick component 20 to the initial position. For example, when the first joystick component 20 only moves in parallel relative to the first shell 10 and the body 402 along the direction of the first axis, because the first joystick component 20 displaces relative to the direction of the first axis, but does not displace relative to the direction of the second axis, only the first restoring component 30 generates a force that restores the first joystick component 20, so that the first joystick component 20 and the first magnetic element 60 are restored to the initial position, but the second restoring component 40 does not generate a force that restores the first joystick component 20. Likewise, when the first joystick component 20 only moves in parallel relative to the first shell 10 and the body 402 along the direction of the second axis, because the first joystick component 20 displaces relative to the direction of the second axis, but does not shift relative to the direction of the first axis, only the second restoring component 40 generates a force that restores the first joystick component 20, so that the first joystick component 20 and the first magnetic element 60 are restored to the initial position, but the first restoring component 30 does not generate a force that restores the first joystick component 20.

When the first magnetic element 60 is driven from the initial position by the first joystick component 20 to move relative to the first magnetic sensor 702 in the plane along any direction, the first magnetic sensor 702 senses the magnetic field change of the first magnetic element 60, and obtains a moving position of the first magnetic element 60 along any direction in the plane. The processor 410 generates a remote control instruction according to the moving position of the first magnetic element 60 obtained by the first magnetic sensor 702, and the remote control 400 sends the remote control instruction to the remotely controlled movable object, so that the movable object moves in the horizontal plane along a direction corresponding to the direction in which the first magnetic element 60 moves in parallel.

In the first rocker device 100 of the embodiments of the present invention, the first magnetic element 60 is driven from the initial position by the first joystick component 20 to move in parallel relative to the first magnetic sensor 702 along any direction in the plane, the first restoring component 30 and the second restoring component 40 may generate a composite force to restore the first joystick component 20, so that the first magnetic element 60 is restored to the initial position, to simplify the operation. In addition, the parallel moving direction of the first joystick component 20 may correspond to the moving direction of the remotely controlled movable object, so that the operation of the first rocker device 100 is intuitive, simple, and easy for a user to memorize.

The second joystick component of the second rocker device 200 can move relative to the body 402, to trigger the remote control 400 to generate a remote control instruction. The moving includes swinging, rotating, and moving in parallel. For example, the second rocker device 200 may use a swing structure in the prior art to trigger the remote control 400 to generate a first remote control instruction when the second joystick component of the second rocker device 200 swings along a first direction (such as swinging forward relative to a user); trigger the remote control 400 to generate a second remote control instruction when the second joystick component of the second rocker device 200 swings along a second direction (such as swinging backward relative to the user); trigger the remote control 400 to generate a third remote control instruction when the second joystick component of the second rocker device 200 swings along a third direction (such as swinging to the left relative to the user); and trigger the remote control 400 to generate a fourth remote control instruction when the second joystick component of the second rocker device 200 swings along a fourth direction (such as swinging to the right relative to the user).

For another example, the second joystick component of the second rocker device 200 may move in parallel along a central axis and in a direction away from the first magnetic sensor 702, to trigger the remote control 400 to generate a first remote control instruction; the second joystick component of the second rocker device 200 may move in parallel along a central axis and in a direction close to the first magnetic sensor 702, to trigger the remote control 400 to generate a second remote control instruction; and the second joystick component of the second rocker device 200 may rotate clockwise or anticlockwise around a central axis, to trigger the remote control 400 to generate a third remote control instruction or a fourth remote control instruction.

The first remote control instruction, the second remote control instruction, the third remote control instruction, and the fourth remote control instruction may control the movable object to perform any one of the following movements: controlling the movable object to move upward in a vertical direction, controlling the movable object to move downward in a vertical direction, controlling the movable object to rotate along a clockwise direction in a horizontal plane of the movable object, and controlling the movable object to rotate along an anticlockwise direction in a horizontal plane of the movable object.

The following describes the structure of the second rocker device 200 in detail by using exemplary embodiments of the present invention.

Figure 12:
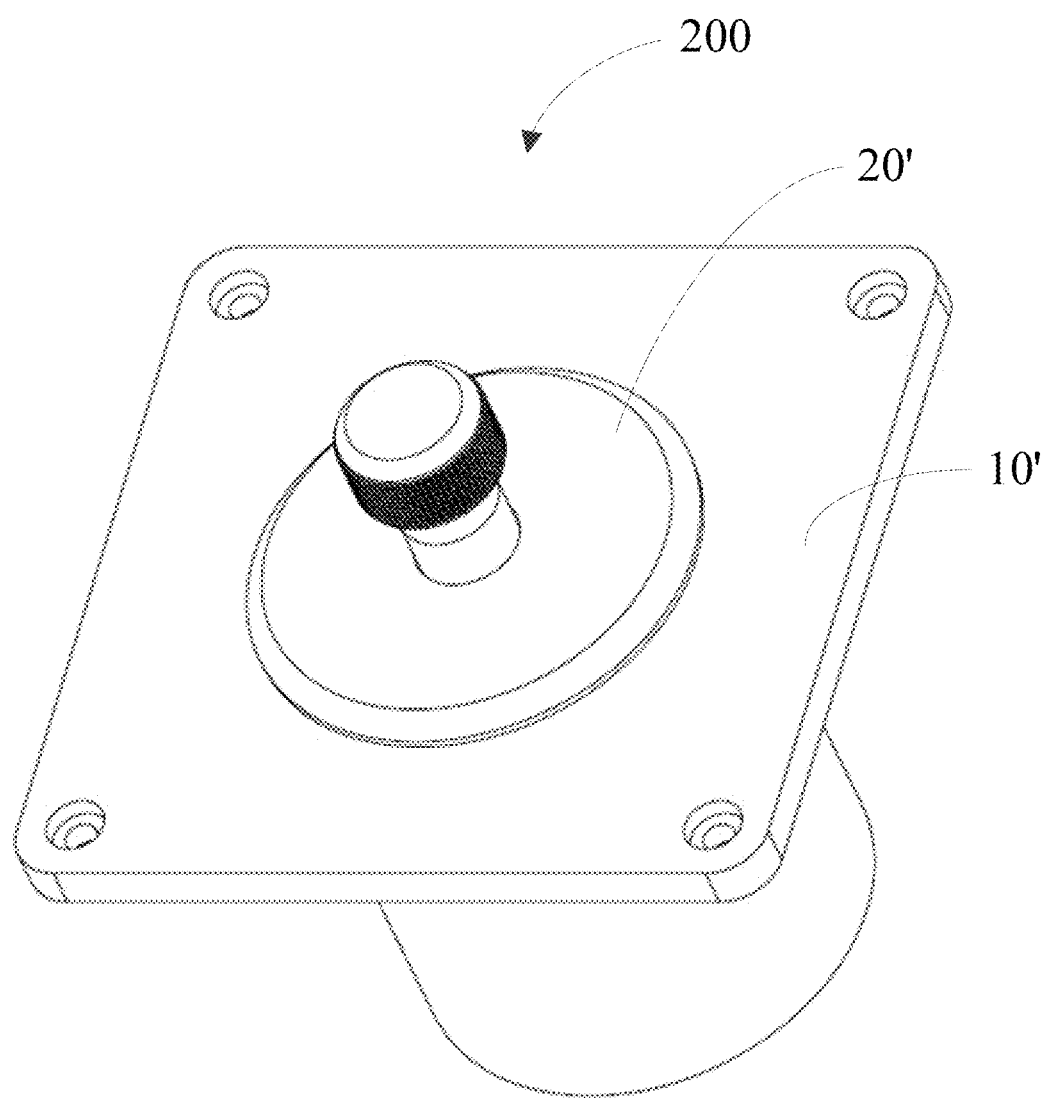
FIG. 12 is a three-dimensional view of a second rocker device in the remote control shown in FIG. 1.
Figure 13:
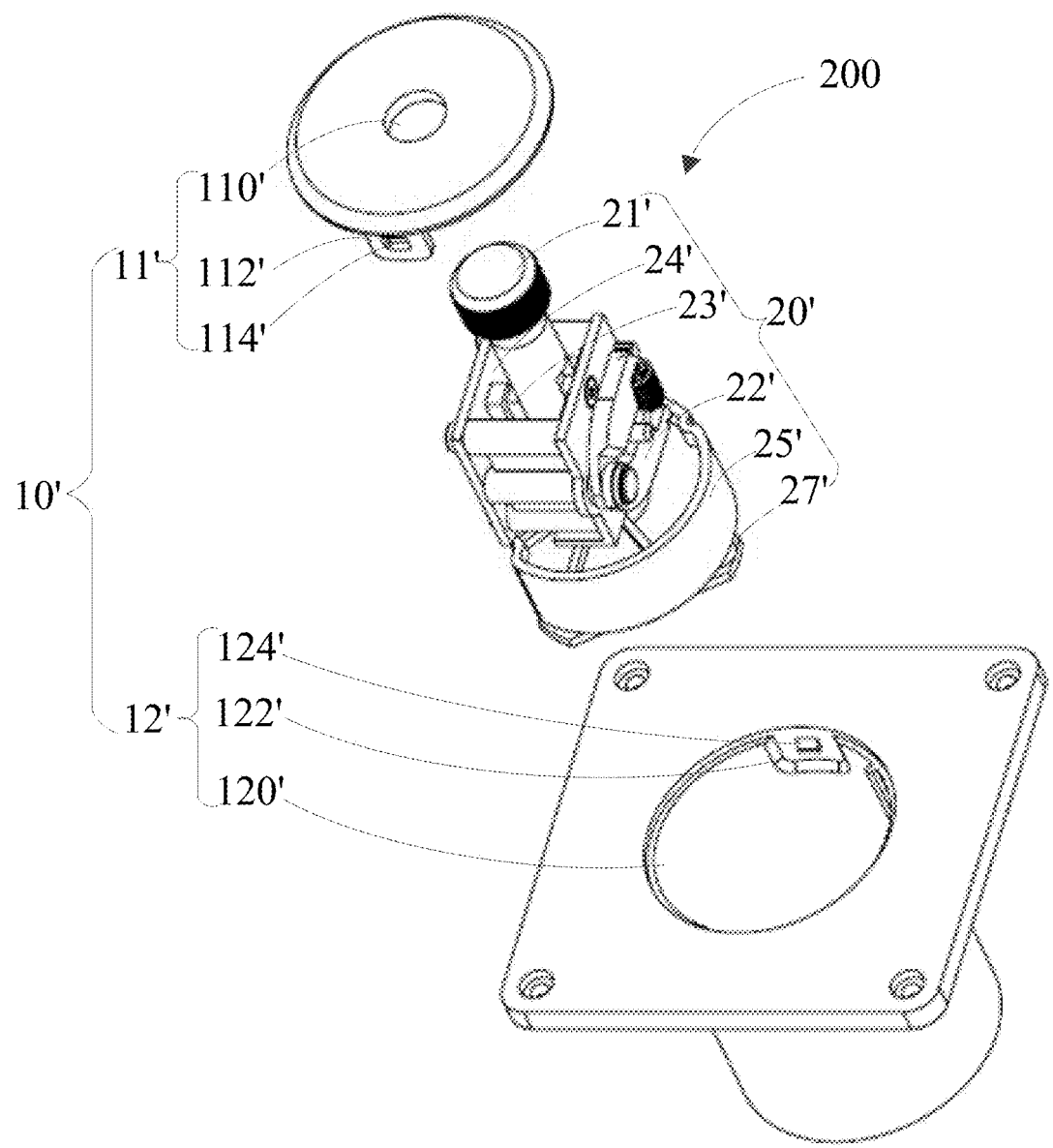
FIG. 13 is an exploded view of the second rocker device shown in FIG. 12.

Referring to FIG. 12 and FIG. 13, the second rocker device 200 includes a second shell 10' and a rocker mechanism 20' installed on the second shell 10'.

The second shell 10' includes a third shell portion 11' and a fourth shell portion 12'. The third shell portion 11' is roughly laminar, the central portion of the third shell portion 11' is provided with a lever through hole 110', two fixture blocks 112' are separately perpendicularly extended from two relative sides of the third shell portion 11', an outer side of each fixture block 112' is provided with a groove 114', and the two grooves 114' of the two fixture blocks 112' are disposed in opposite directions.

The fourth shell portion 12' is provided with a cylindrical second cavity 120', an inner wall of the second cavity 120' is provided with two relatively disposed slots 122', and an inner wall of each slot 122' is disposed with a protrusion 124'. When the third shell portion 11' and the fourth shell portion 12' are buckled with each other, to cover an opening of the second cavity 120', the fixture block 112' is correspondingly inserted into the slot 122', and the groove 114' correspondingly accommodates the protrusion 124', so that the third shell portion 11' can be rapidly and accurately installed into the fourth shell portion 12'.

Figure 14:
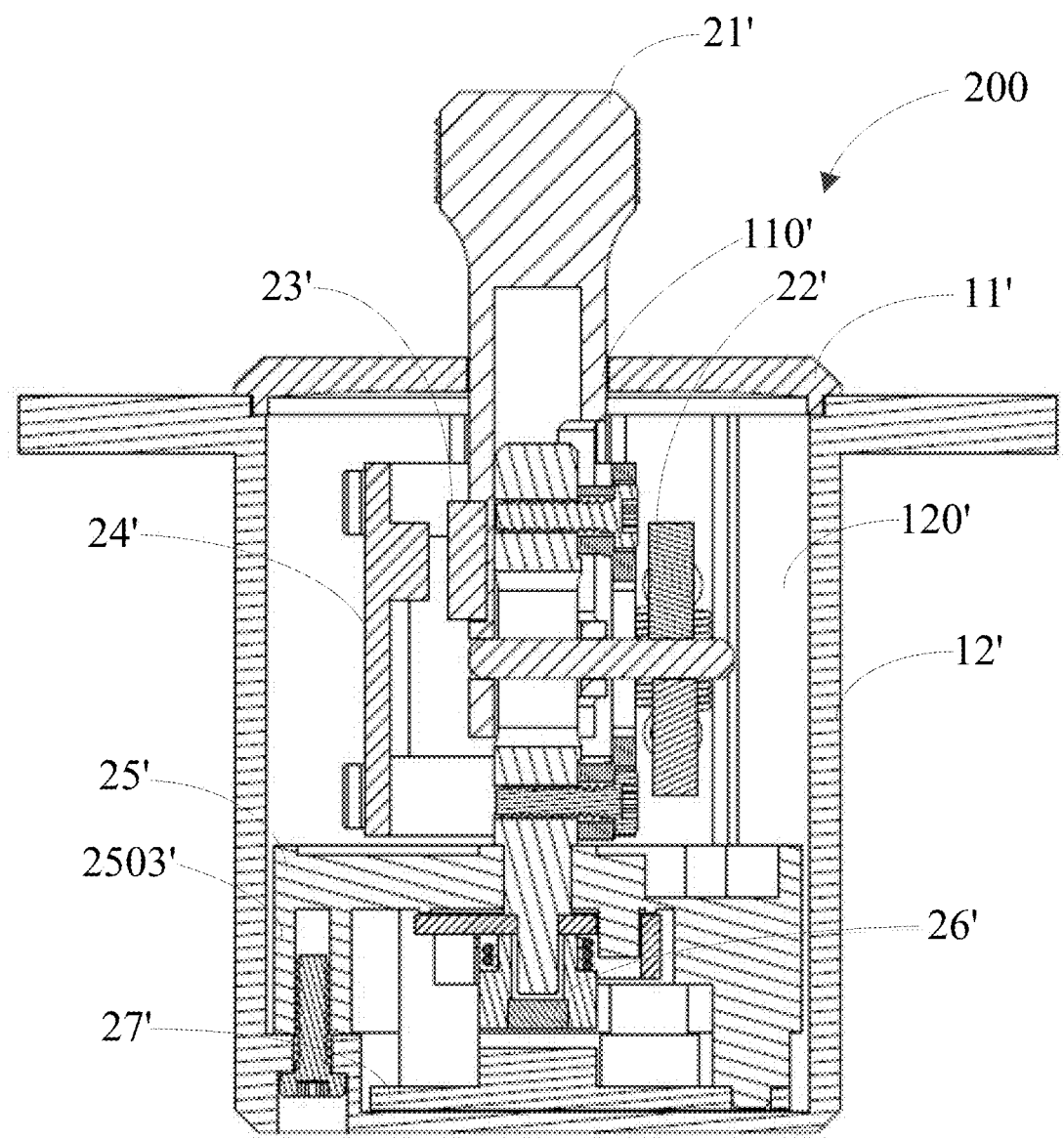
FIG. 14 is a sectional view of the second rocker device shown in FIG. 12.
Figure 15:
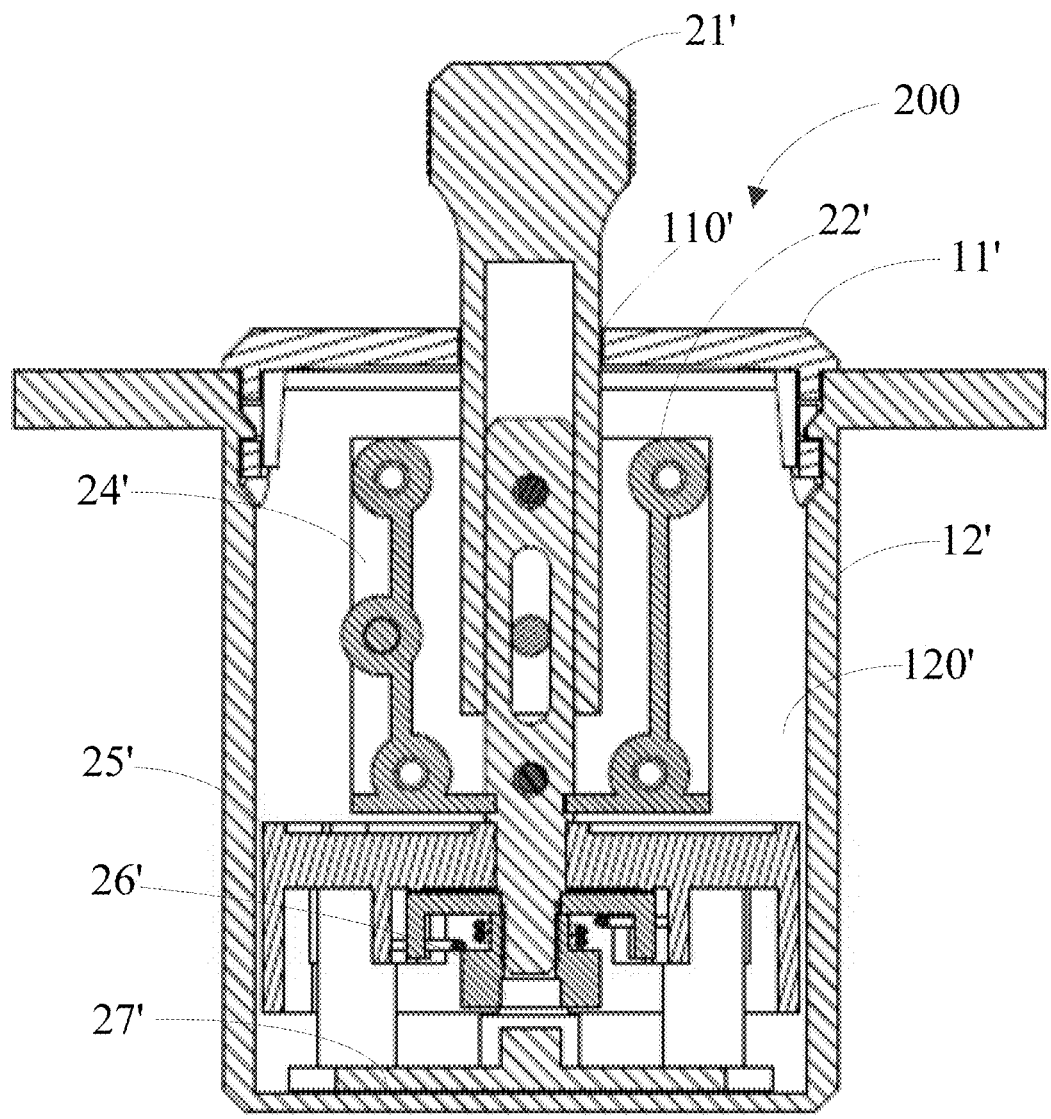
FIG. 15 is another sectional view of the second rocker device shown in FIG. 12.

Referring to FIG. 14 and FIG. 15, the rocker mechanism 20' of the second rocker device 200 includes a second joystick component 21', a third restoring component 22', a second magnetic element 23', a second circuit board 24', a fourth restoring component 25', a third magnetic element 26', and a third circuit board 27'. The second joystick component 21' partially penetrates the lever through hole 110', and is exposed at the outer part of the second shell 10', and the rest part of the second joystick component 21' is accommodated in the second cavity 120'. The third restoring component 22', the second magnetic element 23', the second circuit board 24', the fourth restoring component 25', the third magnetic element 26', and the third circuit board 27' are accommodated in the second cavity 120'.

The second magnetic element 23' is installed on the second joystick component 21', the second magnetic element 23' may drive the second joystick component 21' from the initial position to move straightly relative to the second circuit board 24' along a first direction or a second direction, and the first direction is opposite to the second direction. The third restoring component 22' is configured to restore the second joystick component 21' along the second direction or the first direction, so that the second magnetic element 23' is restored to the initial position. The third magnetic element 26' is installed on the second joystick component 21', the third magnetic element 26' may drive the second joystick component 21' from the initial position to rotate relative to the third circuit board 27' along a clockwise direction or an anticlockwise direction, and the fourth restoring component 25' is configured to restore the second joystick component 21' along an anticlockwise direction or a clockwise direction, to drive the third magnetic element 26' to restore to the initial position.

Figure 16:
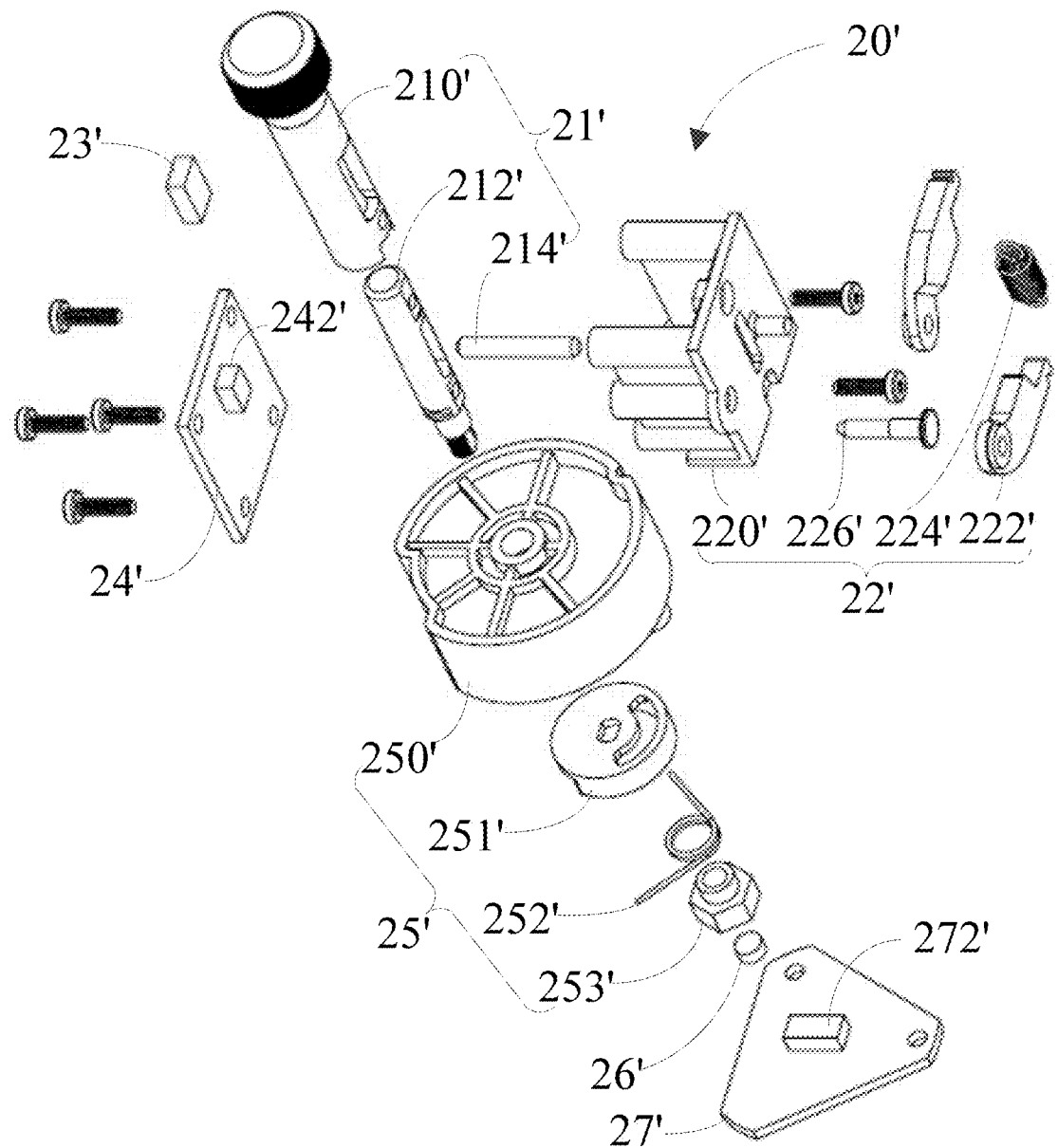
FIG. 16 is an exploded view of a rocker mechanism of the second rocker device shown in FIG. 12.
Figure 17:
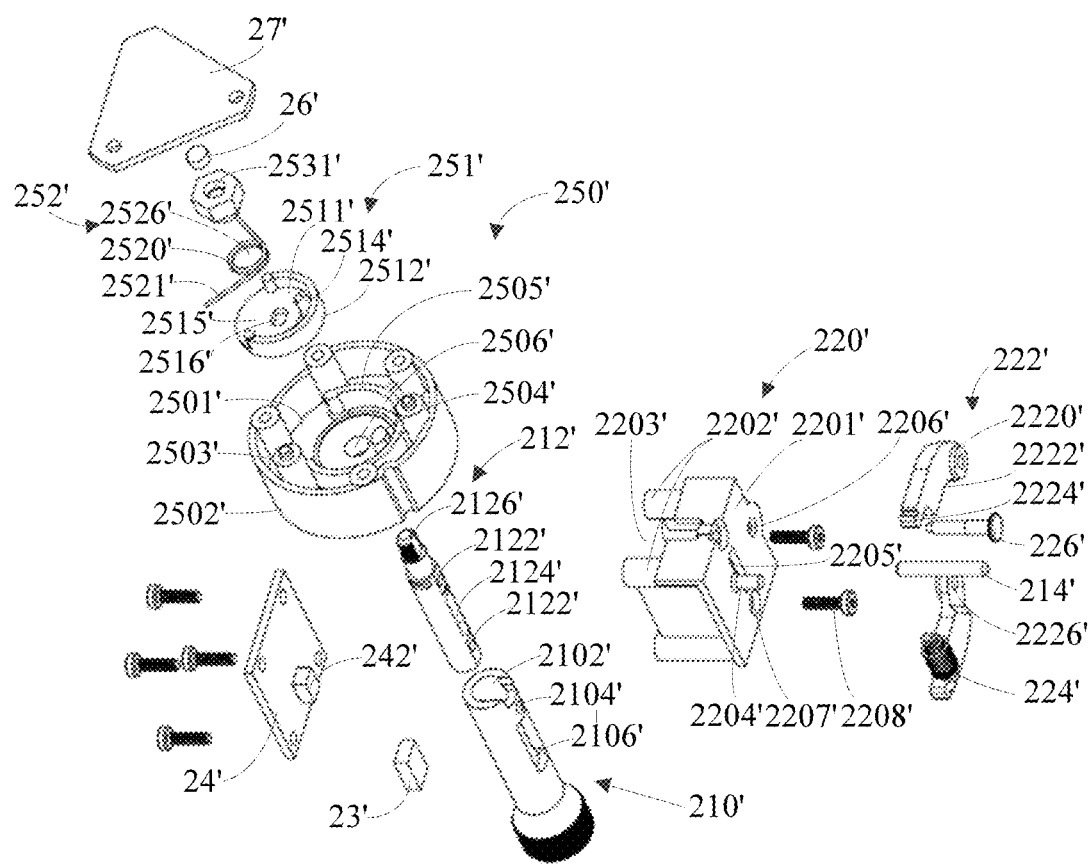
FIG. 17 is an exploded view of another angle of the rocker mechanism shown in FIG. 16.

Referring to FIG. 16 and FIG. 17, the second joystick component 21' includes a second rod body 210', a third rod body 212', and a hinge pin 214'.

The second rod body 210' is a hollow cylinder, and is provided with an accommodating channel 2102', a pin hole 2104', and a notch 2106'. The accommodating channel 2102' is disposed along an axial direction of the second rod body 210', and one end of the second rod body 210' has an opening, the notch 2106' and the pin hole 2104' are provided with an outer side wall of the second rod body 210', and both the notch 2106' and the pin hole 2104' are in communication with the accommodating channel 2102'.

The third rod body 212' is a cylinder, and an outer side wall of the third rod body 212' is provided with two threaded holes 2122' and a sliding slot 2124'. The sliding slot 2124' is strip, and disposed along an axial direction of the third rod body 212'. The two threaded holes 2122' are disposed at two sides of the sliding slot 2124' along the axial direction of the third rod body 212'.

The third rod body 212' includes a connection end 2126', an outer side wall of the connection end 2126' has internal threads, and the connection end 2126' has an oval cross section, and is used to rotate and limit. The third rod body 212' is partially accommodated in the accommodating channel 2102', and may move relative to the second rod body 210' along an axial direction.

One end of the hinge pin 214' penetrates a pin hole 2104' of the second rod body 210', and the hinge pin 214' is accommodated in the sliding slot 2124' of the third rod body 212', and may slide in the sliding slot 2124'.

The second magnetic element 23' is installed on the second rod body 210', the second rod body 210', the hinge pin 214', and the second magnetic element 23' may move straightly together relative to the third rod body 212' along the first direction or the second direction. In this embodiment, central axes of the second rod body 210' and the third rod body 212' are disposed along the first direction and the second direction.

The third restoring component 22' includes a fixing frame 220', a swing block 222', a third elastic element 224', and a fixing axis 226'.

The fixing frame 220' is roughly rectangular, and includes an installation plate 2201' and a support block 2202', two support blocks 2202' are perpendicularly extended from two relative sides of the installation plate 2201', and a lever passage 2203' is provided between the two support blocks 2202'. The second rod body 210' and the third rod body 212' are partially accommodated in the lever passage 2203', and the second circuit board 24' is installed on the two support blocks 2202 by using multiple screws'. The second circuit board 24', the two support blocks 2202', and the installation plate 2201' encircle the second rod body 210' and the third rod body 212'.

The installation plate 2201' includes a third limiting column 2204', and one end of the third limiting column 2204' is perpendicularly connected to a surface of the installation plate 2201' back to the support block 2202'. The installation plate 2201' is provided with a first guide slot 2205', a first installation hole 2206', and a second installation hole 2207'. The first guide slot 2205' is strip, and disposed along an axial direction of the second rod body 210'. The first installation hole 2206' and the third limiting column 2204' are at two relative sides of the first guide slot 2205', and two second installation holes 2207' are at the other two relative sides of the first guide slot 2205'. After penetrating the two second installation holes 2207', two screws 2208' are inserted into the two threaded holes 2122' of the third rod body 212', to fix the third rod body 212' and the installation plate 2201' together.

The quantity of the swing blocks 222' is two, each swing block 222' includes a hinged end 2220', an abutting portion 2222', and a free end 2224', and the abutting portion 2222' is located between the hinged end 2220' and the free end 2224'. The hinged end 2220' is provided with a hinged hole 2226', and after penetrating two hinged holes 2226' of the two swing blocks 222', the fixing axis 226' is inserted into the first installation hole 2206' to hinge the two swing blocks 222' to the installation plate 2201'.

One end of the third elastic element 224' is connected to the free end 2224' of one swing block 222', and the other end of the third elastic element 224' is connected to the free end 2224' of the other swing block 222'.

The hinge pin 214' penetrates the first guide slot 2205', and is clamped between two abutting portions 2222' of the two swing blocks 222' side by side together with the third limiting column 2204'.

In this embodiment, the third elastic element 224' is a tension spring. It may be understood that, in some other embodiments, the third elastic element 224' may be another elastic element that may provide a resilience pulling force, such as a rubber band.

The second circuit board 24' includes a second magnetic sensor 242', and the second magnetic sensor 242' is faced to the second magnetic element 23', and configured to sense a magnetic field change of the second magnetic element 23', and obtain a moving position of the second magnetic element 23'. The second circuit board 24' generates a corresponding remote control instruction according to the moving position of the second magnetic element 23' obtained by the second magnetic sensor 242'. In this embodiment, the second magnetic sensor 242' is a Hall element. It may be understood that, in some other embodiments, the second magnetic sensor 242' may be another magnetic sensor that may sense the magnetic field change, such as a magnetic encoder.

The fourth restoring component 25' includes a connection frame 250', a rotation piece 251', a torsion spring 252', and a fixing piece 253'.

The connection frame 250' is a hollow cylinder, and includes a round bottom 2501', a circular outer side wall 2502', an installation column 2503', a fourth limiting column 2504', and a cambered inner side wall 2505'. The circular side wall 2502' is perpendicularly connected to an outer edge of the round bottom 2501'. Similarly, the cambered inner side wall 2505' is perpendicularly connected to the round bottom 2501'. One end of the fourth limiting column 2504' and one end of the installation column 2503' are perpendicularly connected to the round bottom 2501'. The middle part of the round bottom 2501' is provided with an around first axis through hole 2506'. The circular outer side wall 2502' and the cambered inner side wall 2505' encircle the first axis through hole 2506', and are centered on the first axis through hole 2506'. The fourth limiting column 2504' is located between the first axis through hole 2506' and the cambered inner side wall 2505', the cambered inner side wall 2505' is located between the fourth limiting column 2503' and the round outer side wall 2502', and the installation column 2503' is in contact with an inner surface of the circular side wall 2502'.

The rotation piece 251' includes a round bottom plate 2511' and a cambered outer side wall 2512', and the cambered outer side wall 2512' is perpendicularly connected to an outer edge of the round bottom plate 2511'. The round bottom plate 2511' is provided with a cambered second guide slot 2514' and a second axis through hole 2516', the cross section of the second axis through hole 2516' is roughly oval, the second axis through hole 2516' is provided in the middle part of the round bottom plate 2511', and the second guide slot 2514' is located between the second axis through hole 2516' and the cambered outer side wall 2512'. A gap 2515' is formed between two ends of the cambered side wall 2512'.

The rotation piece 251' is accommodated in a space limited by the cambered inner side wall 2505', the fourth limiting column 2504' penetrates the second guide slot 2514', and the first axis through hole 2506' is aligned with the second axis through hole 2516'.

The connection frame 250' and the rotation piece 251' are made by injection of plastic materials.

The torsion spring 252' includes a torsion spring body 2520' and two torsion spring support arms 2521', the torsion spring body 2520' has a third axis through hole 2526', and the two torsion spring support arms 2521' are separately connected to the torsion spring body 2520'. The torsion spring body 2520' is accommodated in a space limited by the cambered outer side wall 2512', the third axis through hole 2526' is aligned with the second axis through hole 2516', and the two torsion spring support arms 2521' are exposed from the gap 2515', and separately abutted against two ends of the cambered outer side wall 2512'.

The fixing piece 253' is provided with an accommodating hole 2531', and the third magnetic element 26' is accommodated in the accommodating hole 2531', and is faced to the third circuit board 27'. The fixing piece 253' is partially accommodated in the third axis through hole 2526'. In this embodiment, the fixing piece 253' is a fixing nut.

The connection end 2126' of the third rod body 212' successively penetrates the first axis through hole 2506' and the second axis through hole 2516', and is finally fixedly connected to the fixing piece 253'. The cross section of the connection end 2126' is roughly oval, and the cross section of the second axis through hole 2513' is roughly oval, so that when the connection end 2126' rotates, the rotation piece 251' and the fixing piece 253' may be driven together to rotate relative to the connection frame 250'. It may be understood that, in some other embodiments, the cross section of the connection end 2126' and the cross section of the second axis through hole 2513' may be other rotating and limiting structures. For example, the cross section of the connection end 2126' and the cross section of the second axis through hole 2513' may be D-shaped.

The third circuit board 27' includes a third magnetic sensor 272', and the third magnetic sensor 272' is faced to the third magnetic element 26', and configured to sense a magnetic field change of the third magnetic element 26', and obtain a moving position of the third magnetic element 26'. The third circuit board 27' generates a corresponding remote control instruction according to the moving position of the third magnetic element 26' obtained by the third magnetic sensor 272'. The third circuit board 27' is fixedly installed on the connection frame 250'. In this embodiment, the third magnetic sensor 272' is a Hall element. It may be understood that, in some other embodiments, the third magnetic sensor 272' may be another magnetic sensor that may sense the magnetic field change, such as a magnetic encoder.

Figure 18:
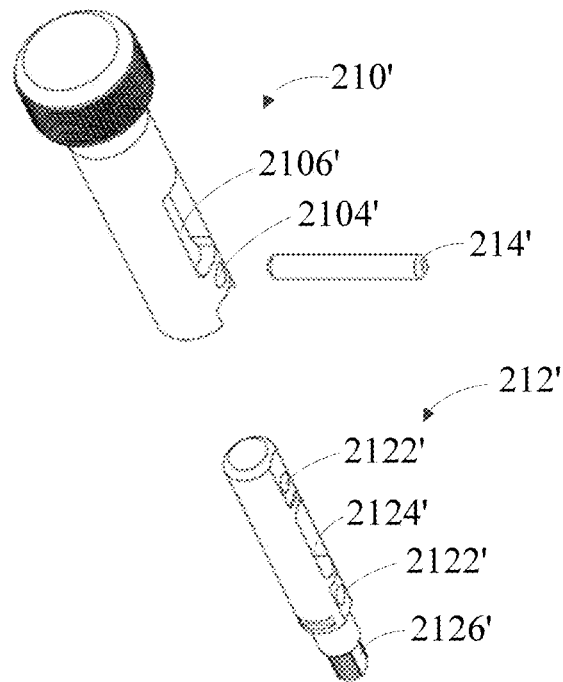
FIG. 18 is an exploded view of a second joystick component of the rocker mechanism shown in FIG. 16.
Figure 19:
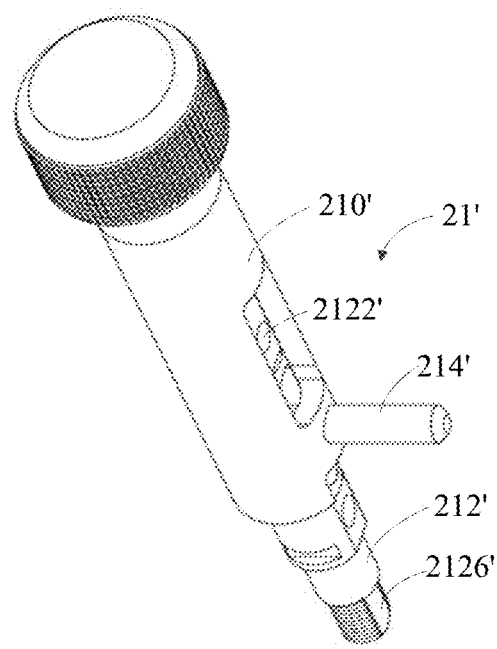
FIG. 19 is a three-dimensional view of the second joystick component shown in FIG. 18.
Figure 20:
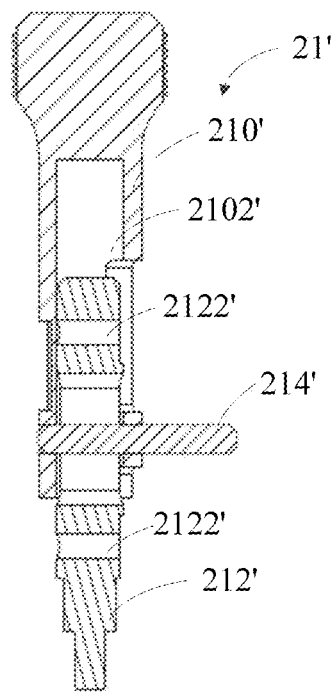
FIG. 20 is a sectional view of the second joystick component shown in FIG. 18.

During assembly, referring to FIG. 18 to FIG. 20, the third rod body 212' is inserted into the accommodating channel 2102' of the second rod body 210', and one end of the hinge pin 214' is inserted into the sliding slot 2124' of the third rod body 212' after penetrating the pin hole 2104', to obtain the second joystick component 21' through assembly. One of the two threaded holes 2122' is exposed from the notch 2106'. The connection end 2126' is exposed outside of the accommodating channel 2102'. When the second rod body 210' and the hinge pin 214' move together straightly along the first direction or the second direction, one end of the hinge pin 214' moves in the sliding slot 2124'.

Figure 21:
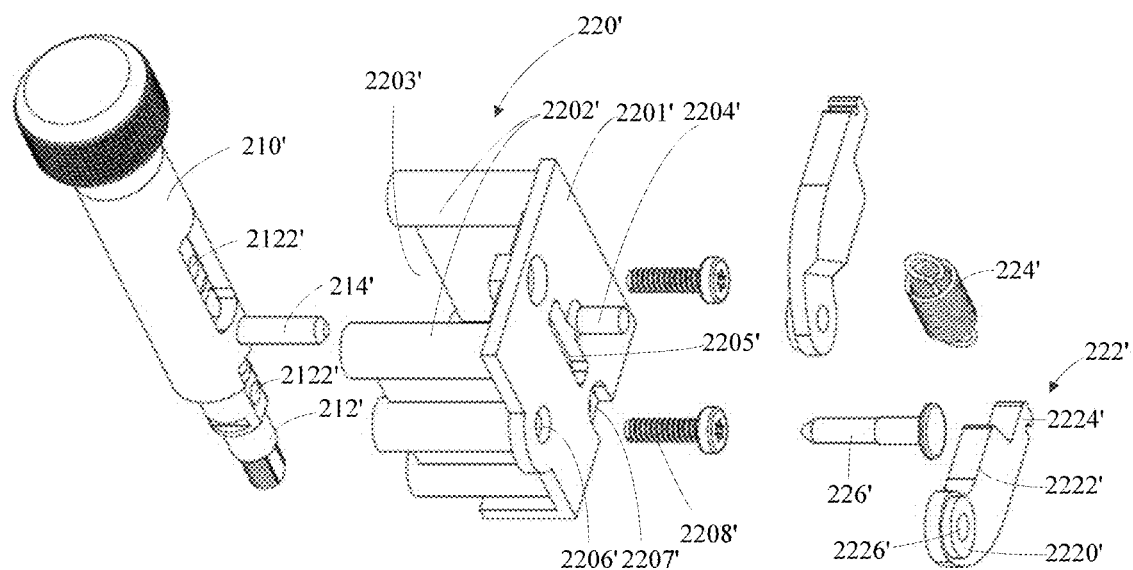
FIG. 21 is a schematic assembly view of a second joystick component and a third restoring component of the rocker mechanism shown in FIG. 16.
Figure 22:
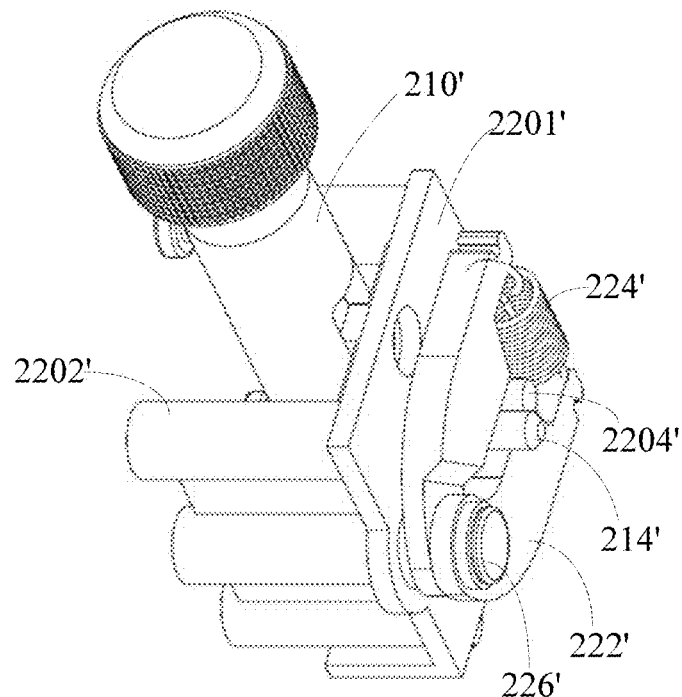
FIG. 22 is a three-dimensional view of the second joystick component and the third restoring component shown in FIG. 21.
Figure 23:
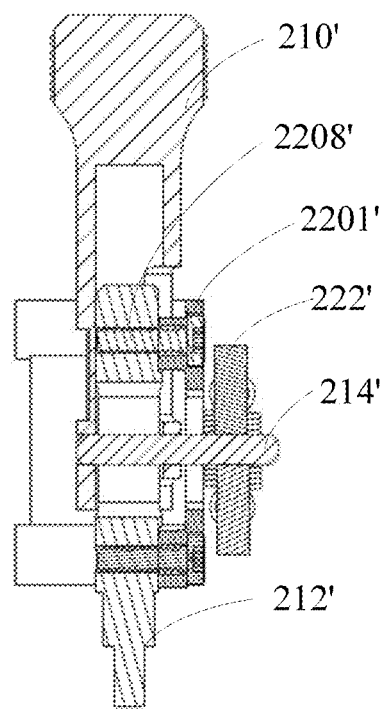
FIG. 23 is a sectional view of the second joystick component and the third restoring component shown in FIG. 22.

Referring to FIG. 21 to FIG. 23, the hinge pin 214' penetrates the first guide slot 2205', the second rod body 210' and the third rod body 212' are accommodated in the lever passage 2203', and the screw 2208' is inserted and fixed in the threaded hole 2122' after penetrating the second installation hole 2207', so that the third rod body 212' is fixed on the installation plate 2201'. The hinged holes 2226' of the two swing pieces 222' are directed at the first installation hole 2206', and the fixing axis 226' is inserted and fixed in the first installation hole 2206' after penetrating the hinged hole 2226', so that the swing piece 222' is hinged on the installation plate 2201', the hinge pin 214' and the third limiting column 2204' are clamped between the two abutting portions 2222' of the two swing pieces 222' side by side. Two ends of the third elastic element 224' are separately connected to two free ends 2224' of the two swing pieces 222'.

Figure 24:
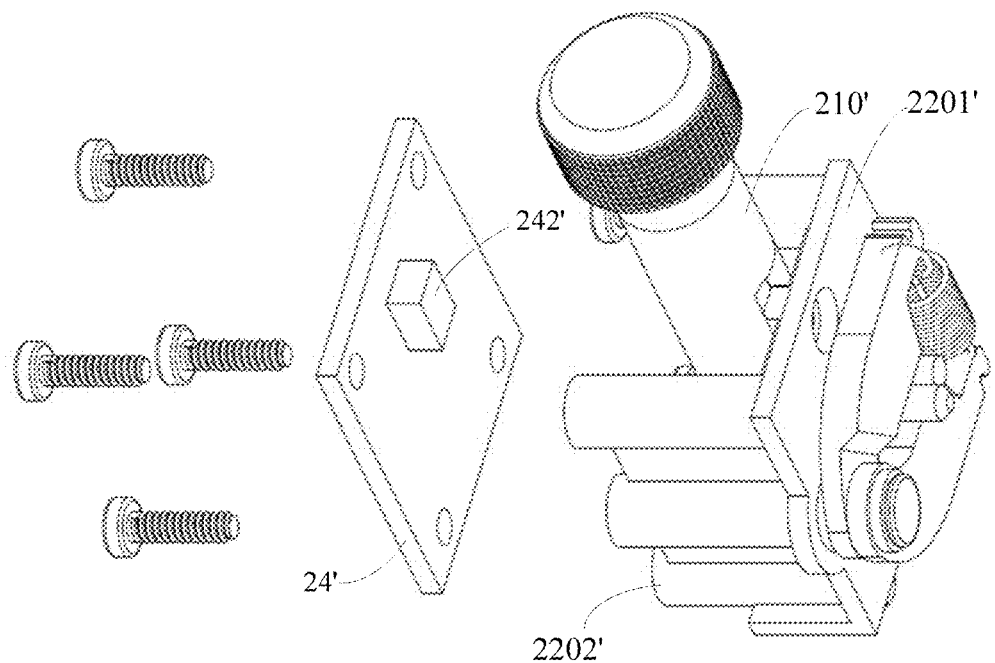
FIG. 24 is a schematic assembly view of a second joystick component, a third restoring component, and a second circuit board of the rocker mechanism shown in FIG. 16.
Figure 25:
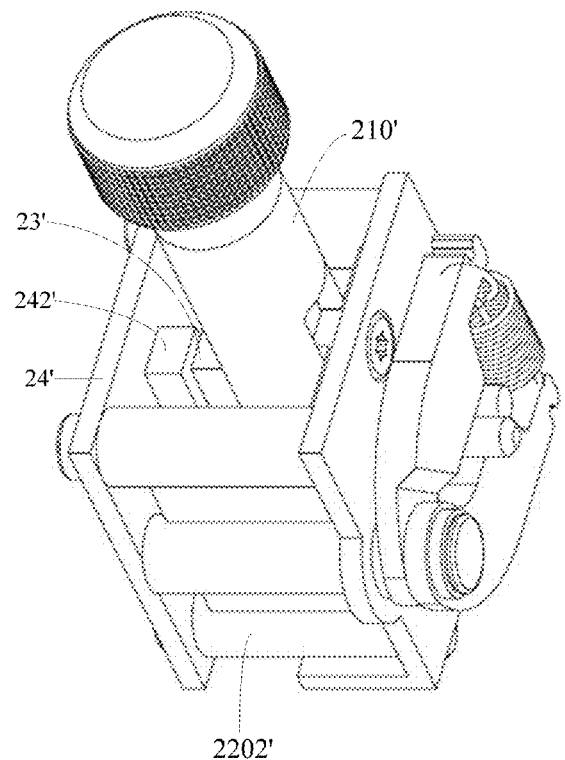
FIG. 25 is a three-dimensional view of the second joystick component, the third restoring component, and the second circuit board shown in FIG. 24.
Figure 26:
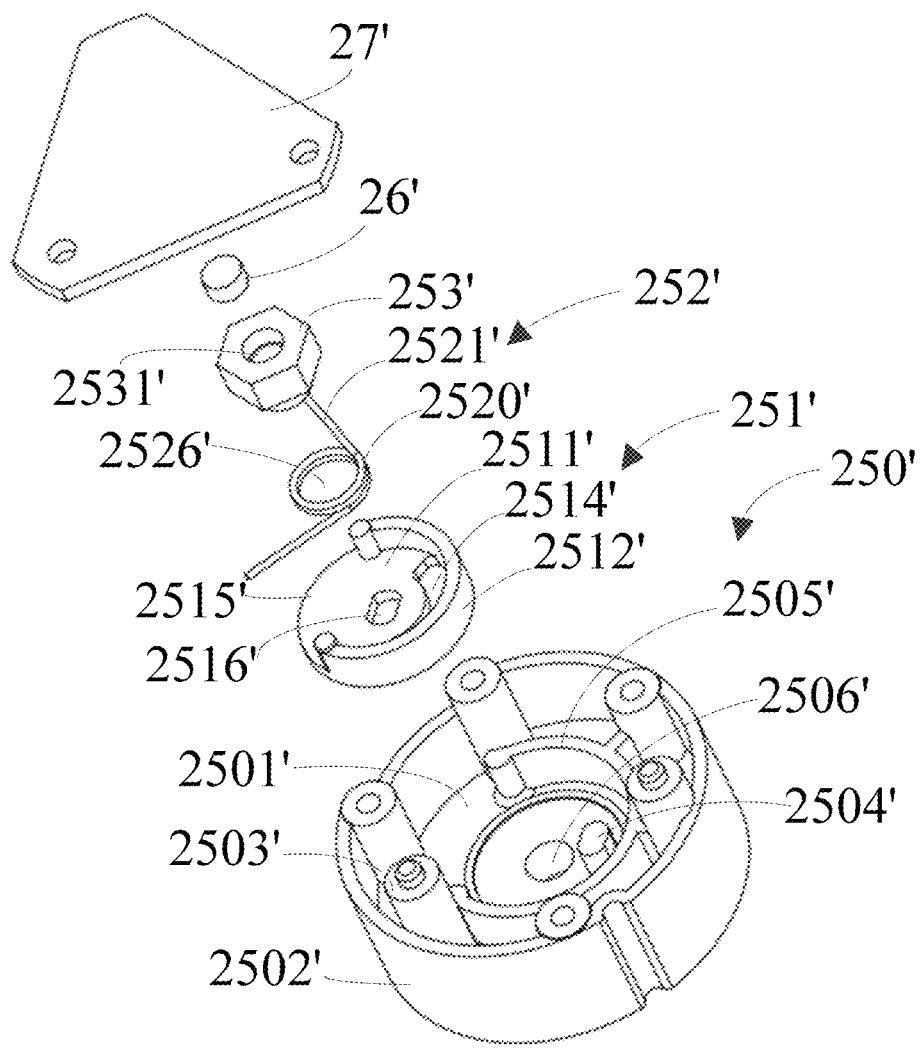
FIG. 26 is an exploded view of a fourth restoring component and a third circuit board of the rocker mechanism shown in FIG. 16.
Figure 27:
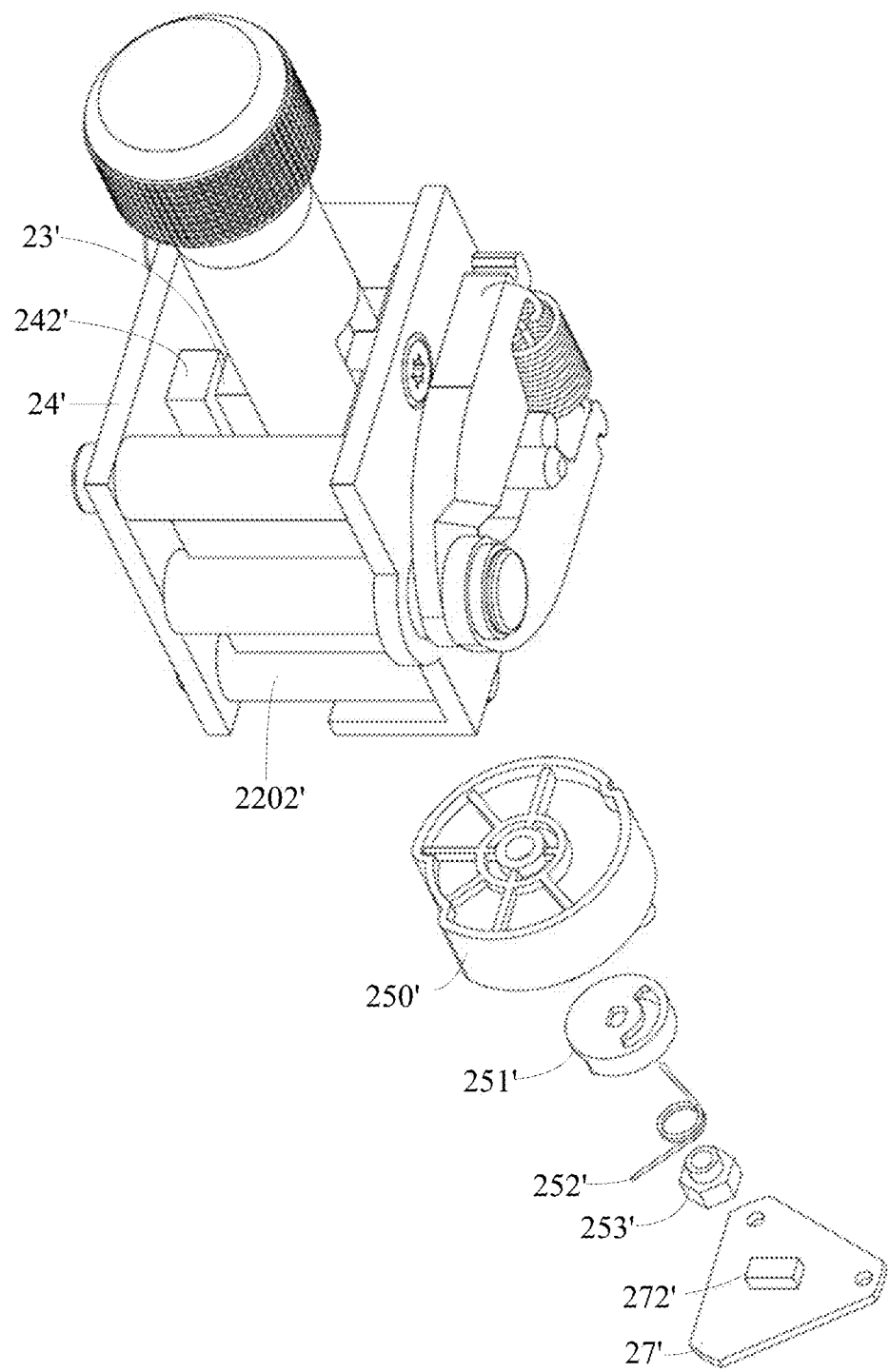
FIG. 27 is a schematic assembly view of a second joystick component, a third restoring component, a second circuit board, a fourth restoring component, and a third circuit board according to an embodiment of the present invention.
Figure 28:
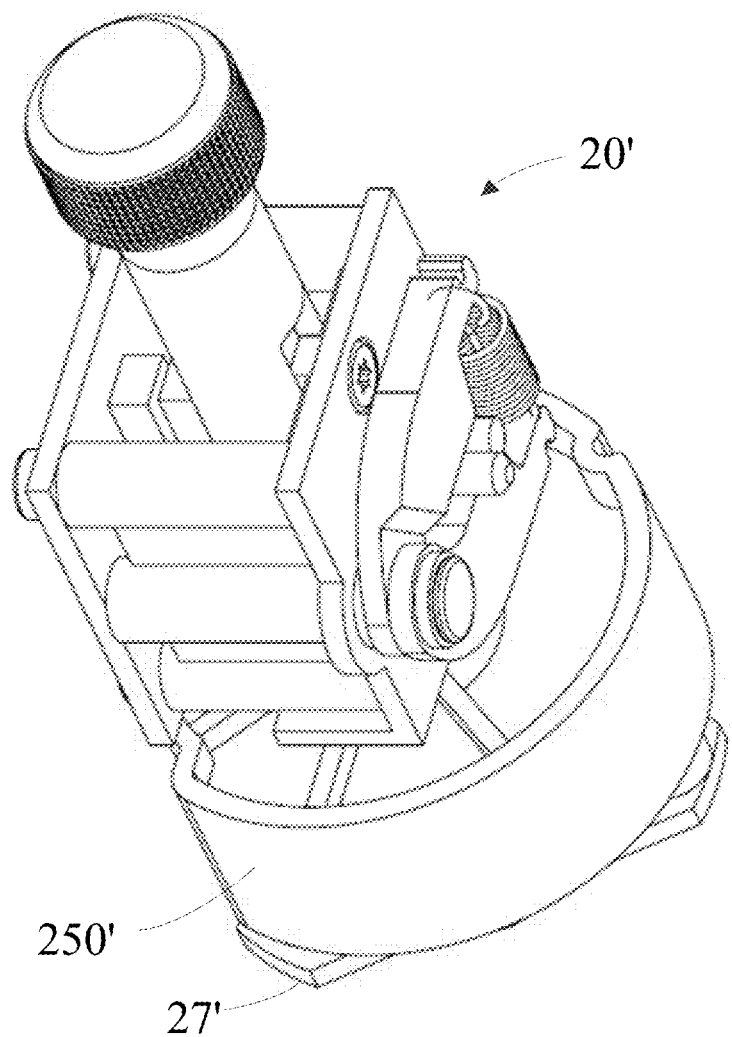
FIG. 28 is a three-dimensional view of the second joystick component, the third restoring component, the second circuit board, the fourth restoring component, and the third circuit board shown in FIG. 27.
Figure 29:
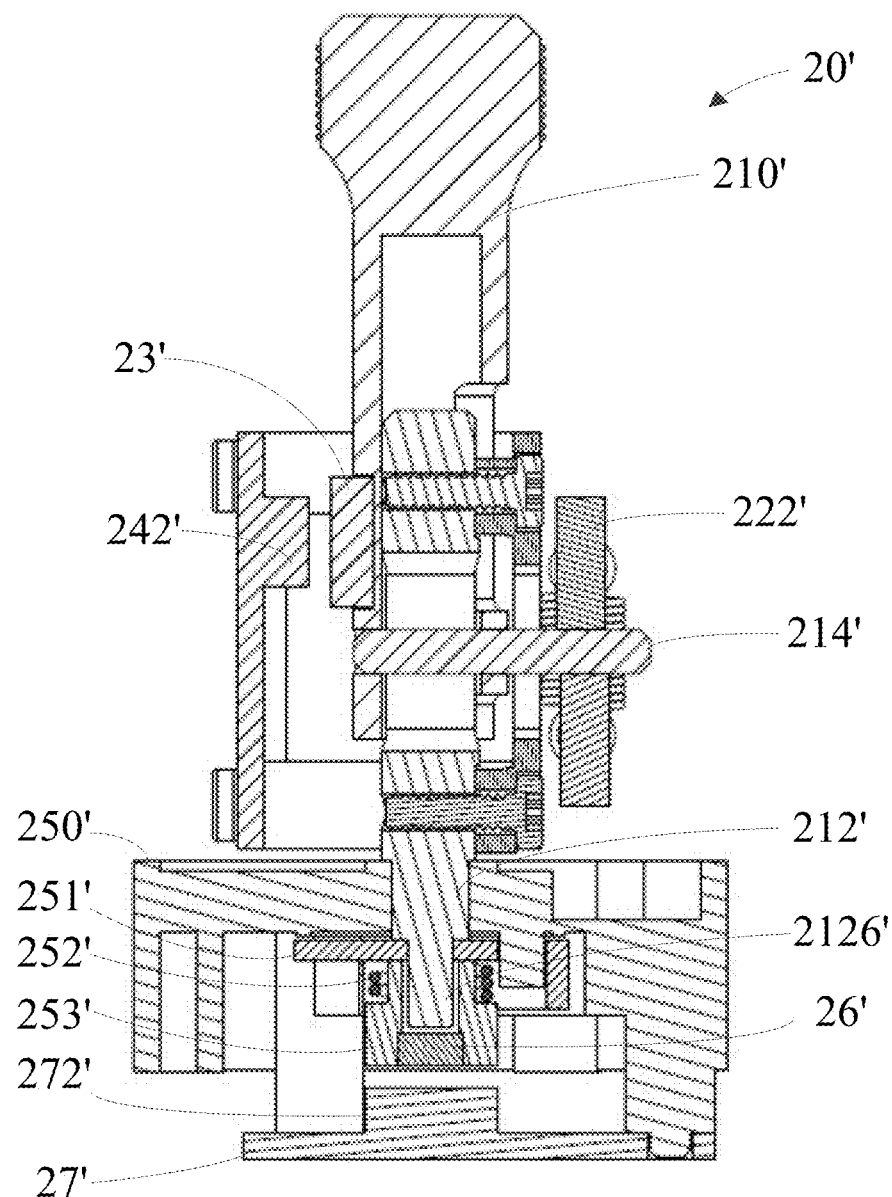
FIG. 29 is a sectional view of the second joystick component, the third restoring component, the second circuit board, the fourth restoring component, and the third circuit board shown in FIG. 28.

Referring to FIG. 24 and FIG. 25, the second magnetic element 23' is installed on the second rod body 210', and the second circuit board 24' is fixedly installed on the two support blocks 2202', so that the second magnetic sensor 242' is faced to the second magnetic element 23'.

Referring to FIG. 26 to FIG. 29, the rotation piece 251' is placed in a space limited by the cambered inner side wall 2505', the fourth limiting column 2504' penetrates the second guide slot 2514', and the first axis through hole 2506' is aligned with the second axis through hole 2516'. The torsion spring body 2520' is placed in a space limited by the cambered outer side wall 2512', the third axis through hole 2526' is aligned with the second axis through hole 2516', and the two torsion spring support arms 2521' are exposed from the gap 2515', and are separately abutted against two ends of the cambered outer side wall 2512'. The third magnetic element 26' is fixed in the accommodating hole 2531' of the fixing piece 253', and the fixing piece 253' is partially accommodated in the third axis through hole 2526'. The connection end 2126' of the third rod body 212' successively penetrates the first axis through hole 2506' and the second axis through hole 2516', and is finally fixedly connected to the fixing piece 253'. The third circuit board 27' is fixedly installed on the two installation columns 2503' of the connection frame 250'. Therefore, the rocker mechanism 20' is obtained through assembly.

Figure 30:
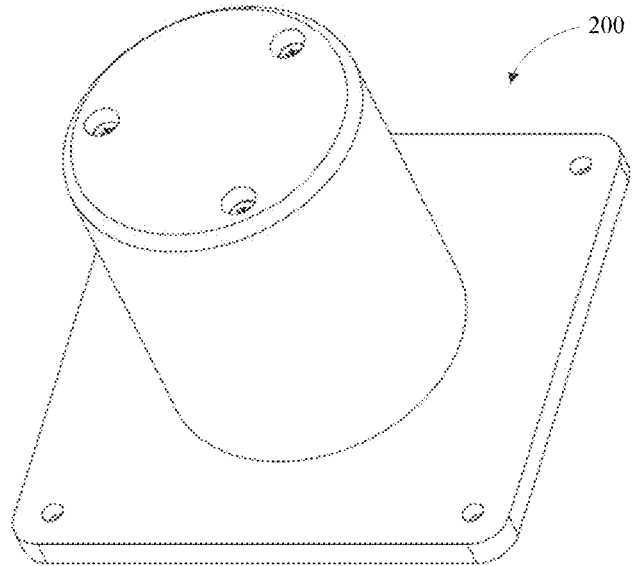
FIG. 30 is a three-dimensional view of another angle of the second rocker device according to an embodiment of the present invention.

Referring to FIG. 30, the rocker mechanism 20' is placed in the second cavity 120', screws are inserted and fixed in three installation column 2503' of the connection frame 250' after penetrating the bottom of the fourth shell portion 12', and the third circuit board 27' is abutted against the bottom of the fourth shell portion 12'. The third shell portion 11' and the fourth shell portion 12' are buckled with each other to cover an opening of the second cavity 120', the fixture block 112' is correspondingly inserted into the slot 122', and the groove 114' correspondingly accommodate the protrusion 124', to obtain the second rocker device 200 (reference may be made to FIG. 13) in the embodiments of the present invention through assembly.

Figure 31:
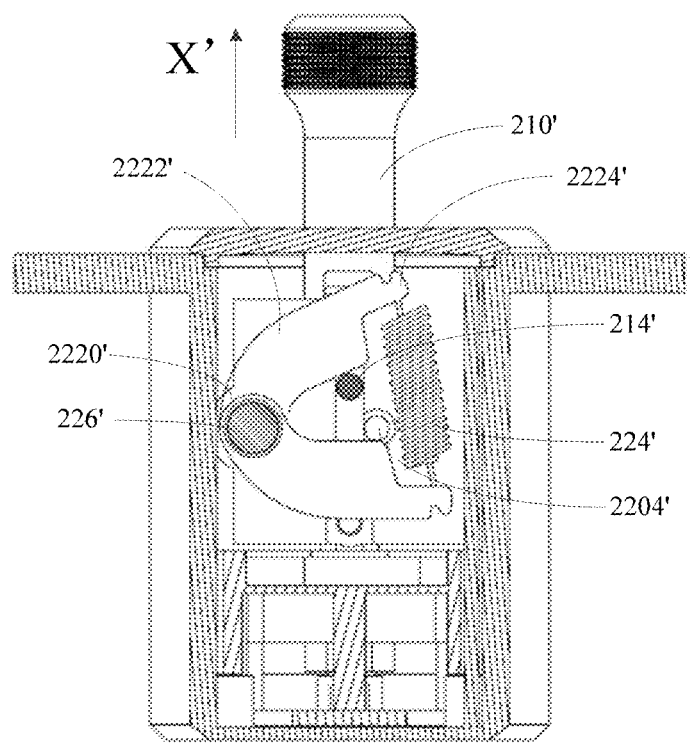
FIG. 31 is a sectional view of the second rocker device according to an embodiment of the present invention, where the second joystick component moves along a first direction.

Referring to FIG. 31, a pulling force is applied to the second rod body 210', so that when the hinge pin 214' moves straightly from the initial position along the first direction (for example, the upward direction represented by X' in FIG. 31) together with the second rod body 210', the third limiting column 2204' is abutted against one of the abutting portions 2222', the hinge pin 214' drives another abutting portion 222' to open along the first direction, and the third elastic element 224' is stretched. The second magnetic element 23' is driven from the initial position by the second rod body 210' to move straightly along the first direction, the second magnetic sensor 242' senses the magnetic field change of the second magnetic element 23', and obtains the moving position of the second magnetic element 23' along the first direction. The second circuit board 24' generates a remote control instruction according to the moving position of the second magnetic element 23' obtained by the second magnetic sensor 242', and the remote control 400 sends the remote control instruction to the controlled movable object, so that the movable object move upward straightly along the vertical direction.

Figure 32:
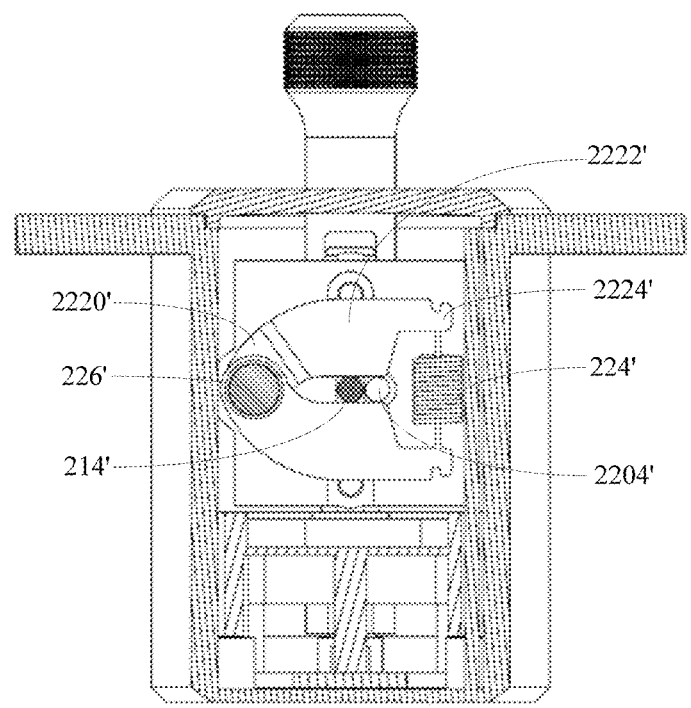
FIG. 32 is a sectional view of the second rocker device according to an embodiment of the present invention, where the second joystick component is restored to an initial position.

Referring to FIG. 32, the pulling force applied to the second rod body 210' disappears, the stretched third elastic element 224' restores to the original shape, to pull the opened swing block 222' to restore, to drive the hinge pin 214', the second rod body 210', and the second magnetic element 23' to restore, so that the second magnetic element 23' moves to the initial position along the second direction.

Figure 33:
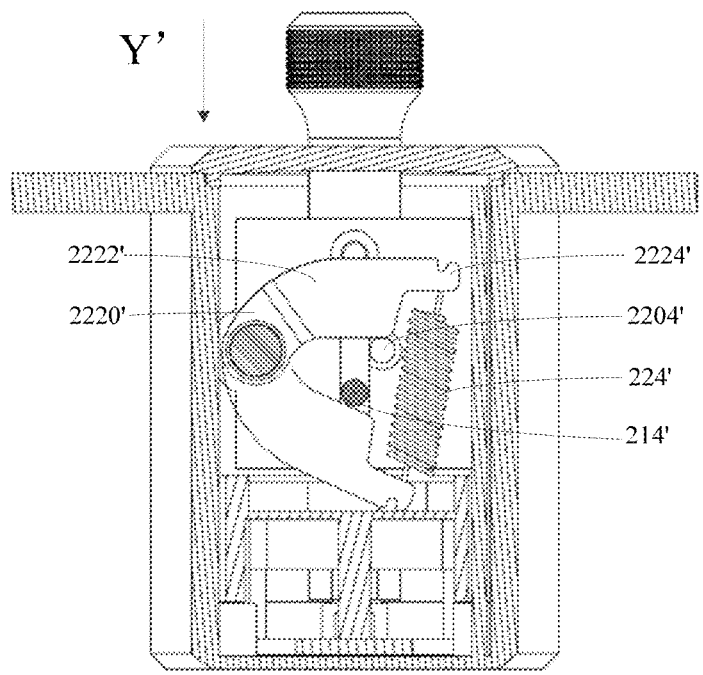
FIG. 33 is a sectional view of the second rocker device according to an embodiment of the present invention, where the second joystick component moves along a second direction.

Referring to FIG. 33, a pushing force is applied to the second rod body 210', so that when the hinge pin 214' moves straightly from the initial position along the second direction (for example, the downward direction represented by Y' in FIG. 33) together with the second rod body 210', the third limiting column 2204' is abutted against one of the abutting portions 2222', the hinge pin 214' drives another abutting portion 2222' to open along the second direction, and the third elastic element 224' is stretched. The second magnetic element 23' is driven from the initial position by the second rod body 210' to move straightly along the second direction, and the second magnetic sensor 242' senses the magnetic field change of the second magnetic element 23', and obtains the moving position of the second magnetic element 23' along the second direction. The second circuit board 24' generates a remote control instruction according to the moving position of the second magnetic element 23' obtained by the second magnetic sensor 242', and the remote control 400 sends the remote control instruction to the controlled movable object, so that the movable object moves downward straightly along the vertical direction.

When the pushing force applied to the second rod body 210' disappears, the stretched third elastic element 224' restores to the original shape, to pull the opened swing block 222' to restore, to drive the hinge pin 214', the second rod body 210', and the second magnetic element 23' to restore, so that the second magnetic element 23' moves to the initial position along the first direction.

Figure 34:
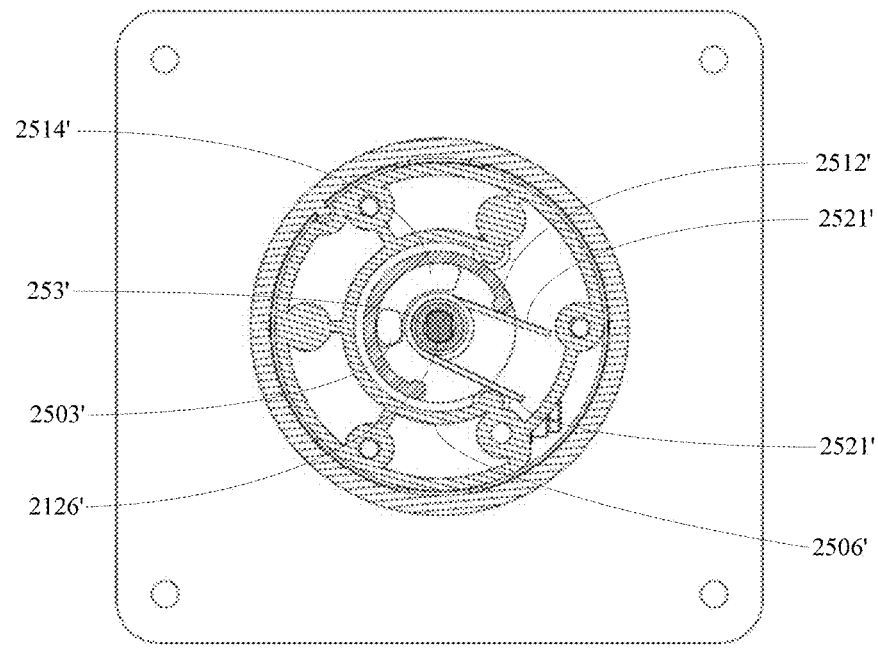
FIG. 34 is a sectional view of the second rocker device according to an embodiment of the present invention, where the second joystick component rotates along a clockwise direction or an anticlockwise direction.
Figure 35:
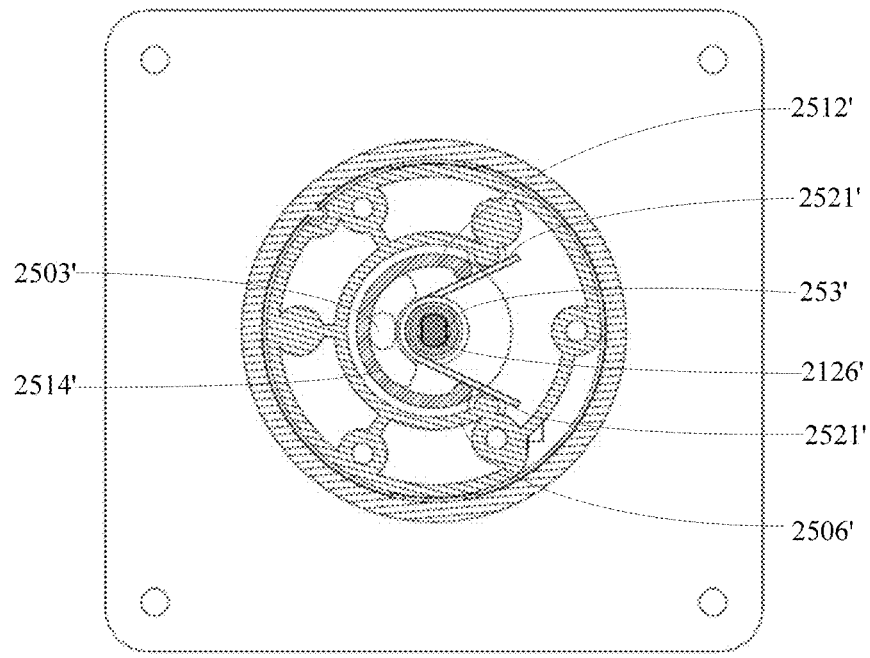
FIG. 35 is a sectional view of the second rocker device according to an embodiment of the present invention, where the second joystick component is restored to an initial position along a clockwise direction or an anticlockwise direction.

Referring to FIG. 34 and FIG. 35, a torsion is applied to the second rod body 210', so that the second rod body 210' drives the third rod body 212', the third restoring component 22', and the second circuit board 24' to rotate along the clockwise direction or the anticlockwise direction, and the connection end 2126' drives the rotation piece 251' and the fixing piece 253' to rotate relative to the connection frame 250' and the third circuit board 27' along the clockwise direction or the anticlockwise direction.

When the fixing piece 253' rotates relative to the third circuit board 27' along the clockwise direction or the anticlockwise direction, the third magnetic element 26' rotates from the initial position relative to the third magnetic sensor 272' along the clockwise direction or the anticlockwise direction. The third magnetic sensor 272' senses the magnetic field change of the third magnetic element 26', and obtains a rotation amount of the third magnetic element 23 along the clockwise direction or the anticlockwise direction. The third circuit board 27' generates a remote control instruction according to the rotation amount of the third magnetic element 26' obtained by the third magnetic sensor 272', and the remote control 400 sends the remote control instruction to the controlled movable object, so that the movable object rotates in the horizontal plane of the movable object along the clockwise direction or the anticlockwise direction.

When the rotation piece 251' rotates relative to the connection frame 250', one of the torsion spring support arms 2521' is pushed by one end of the cambered outer side wall 2512', to close to the other torsion spring support arm 2521' and one end of the cambered inner side wall 2506' along the clockwise direction or the anticlockwise direction, and one end of the cambered outer side wall 2512' and one end of the cambered inner side wall 2506' separately extrude the two torsion spring support arms 2521', so that the torsion spring 252' is compressed.

When the torsion applied to the second rod body 210' disappears, the torsion spring 252' restores to the original shape, the two torsion spring support arms 2521' separately push one end of the cambered outer side wall 2512' and one end of the cambered inner side wall 2506', the rotation piece 251' rotates relative to the connection frame 250' along the anticlockwise direction or the clockwise direction, and drives the fixing piece 253', the second rod body 210', the third rod body 212', the third restoring component 22', and the second circuit board 24' to restore along the anticlockwise direction or the clockwise direction, so that the third magnetic element 26' rotates to the initial position along the anticlockwise direction or the clockwise direction.

Figure 36:
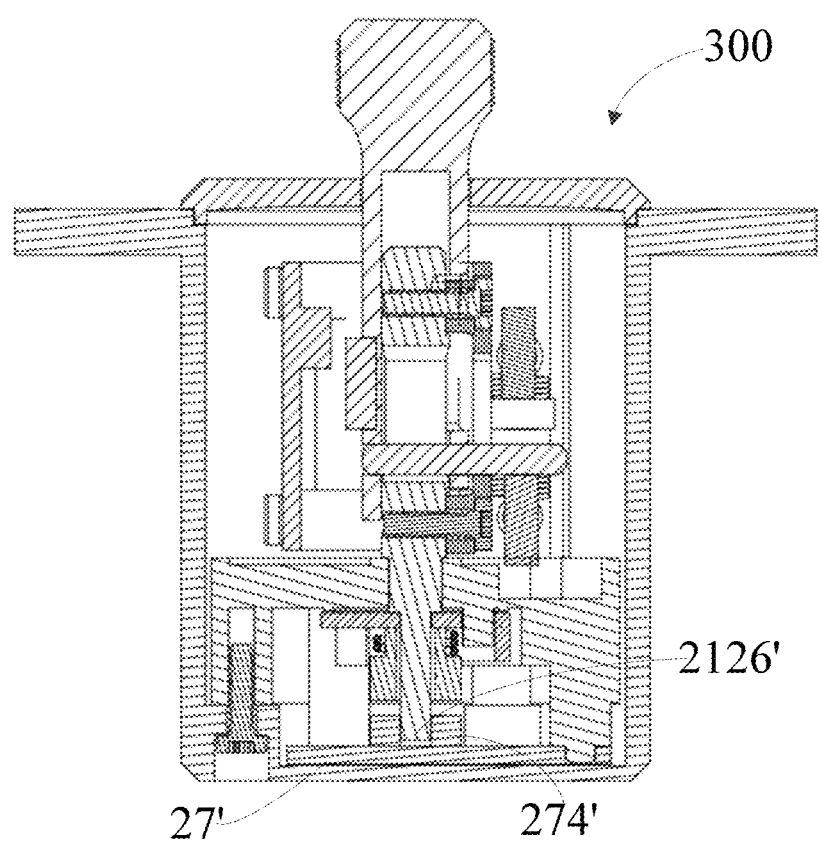
FIG. 36 is a sectional view of the second rocker device according to another embodiment of the present invention.

Referring to FIG. 36, the structure of the second rocker device 300 provided by another embodiment of the present invention is basically the same as the structure of the second rocker device 200 of the foregoing embodiments, and the difference is: the second rocker device 300 replaces the magnetic sensor 272 of the second rocker device 200 with a potentiometer 274'.

The potentiometer 274' is disposed on the circuit board 27'. The connection end 2126' is inserted into the potentiometer 274', and in contact with the potentiometer 274'. The potentiometer 274' includes a resistor body, and the connection end 2126' includes an electric brush.

When the connection end 2126' rotates relative to the potentiometer 274' and the third circuit board 27' along the clockwise direction or the anticlockwise direction, the potentiometer 274' obtains a rotation amount of the connection end 2126' along the clockwise direction or the anticlockwise direction according to a resistance or voltage change. The circuit board 27' generates a corresponding remote control instruction, and the remote control 400 sends the remote control instruction to the controlled movable object, so that the movable object rotates in the horizontal plane of the movable object along the clockwise direction or the anticlockwise direction.

The second rocker device 300 may replace the second rocker device 200 provided in the foregoing embodiments, and is installed on the body 402.

In the second rocker devices 200 and 300 of the embodiments, the second rod body 210' only has actions in four directions: moving straightly along a first direction and a second direction, and rotating along a clockwise direction and an anticlockwise direction. The movable object separately controlled to perform a vertical upward movement (that is, an ascending movement), a vertical downward movement (that is, a descending movement), a clockwise rotation movement (that is, rotating to the right), and an anticlockwise rotation movement (that is, rotating to the left). The operation actions of a user for the second rocker device are just in a one-to-one correspondence with the movement actions of the movable object, so that the operation of the remote control is more simple and understandable, and easy for the user to memorize. In addition, when the force applied to the second rod body 210' disappears, the third restoring component 22' or the fourth restoring component 25' may restore the second rod body 210', to further simplify the operation of the second rocker device 200.

In some embodiments, the movable object is an unmanned aerial vehicle, and the remote control 400 is configured to control the unmanned aerial vehicle. When the first joystick component 20 of the first rocker device 100 moves in parallel relative to the first shell 10 along the first axis, for example, when the first joystick component 20 moves forward in parallel or move backward in parallel relative to the user, the remote control 400 remotely controls the unmanned aerial vehicle to move forward or move backward relative to the user, that is, fly forward or fly backward in a plane of the unmanned aerial vehicle. When the first joystick component 20 moves in parallel along any direction, for example, when the first joystick component 20 moves in parallel to the front right side relative to the user, the remote control 400 remotely controls the unmanned aerial vehicle to move to the front right side relative to the user, that is, fly to the front right direction in a plane of the unmanned aerial vehicle. The movement direction of the first joystick component 20 is in a one-to-one correspondence with the movement direction in the plane of the unmanned aerial vehicle, so that the operation of the remote control 400 is intuitive and simple. The first restoring component 30 and the second restoring component 40 may generate a composite force to restore the first joystick component 20, so that the first magnetic element 60 is restored to the initial position, to simplify the operation of the remote control device 400.

When the second rod body 210' of the second rocker devices 200 and 300 moves straightly along the first direction (for example, the upward direction in FIG. 31), the remote control 400 controls the unmanned aerial vehicle to ascend; and when the second rod body 210' moves straightly along the second direction (for example, the downward direction in FIG. 33), the remote control 400 controls the unmanned aerial vehicle to descend. When the second rod body 210' rotates along the clockwise direction or the anticlockwise direction, the remote control 400 controls the unmanned aerial vehicle to rotate to the right or rotate to the left.

The movement directions of the second rod body 210' are in a one-to-one correspondence with the movement directions of the unmanned aerial vehicle in the vertical direction and the horizontal plane, so that the operation of the remote control 400 is intuitive and simple. The second rod body 210' only has actions of four directions, and this is easy for the user to memorize. In addition, when the force applied to the second rod body 210' disappears, the third restoring component 22' or the fourth restoring component 25' may restore the second rod body 210', to further simplify the operation of the remote control device 400.

Because the operation of the remote control 400 in the embodiments of the present invention and the first rocker device 100 and/or the second rocker devices 200 and 300 used by the remote control 400 is simple, intuitive, and easy to memorize, a faulty operation on the movable object caused by a user unfamiliar with the operation can be effectively avoided, for example, a bombing phenomenon caused by a faulty operation on an unmanned aerial vehicle can be avoided.

Compared with the prior art, in the remote control of the embodiments of the present invention, when the first joystick component of the first rocker device moves in parallel relative to the body, the processor generates a remote control instruction, where the remote control instruction is used to control the movable object to move in a horizontal plane of the movable object, and the parallel moving direction of the first joystick component may be set to correspond to the moving direction of the movable object in the horizontal plane of the movable object, so that the operation of the remote control is intuitive, simple, and easy to memorize.

In addition, actions of four directions of the second joystick component of the second rocker device are: moving straightly along a first direction and a second direction, and rotating along a clockwise direction and an anticlockwise direction. The movable object is separately controlled to perform a vertical upward movement (that is, an ascending movement), a vertical downward movement (that is, a descending movement), a clockwise rotation movement (that is, rotating to the right), and an anticlockwise rotation movement (that is, rotating to the left). The operation actions of a user for the second rocker device are just in a one-to-one correspondence with the movement actions of the movable object, so that the operation of the remote control is more simple and understandable, and easy for the user to memorize.

Finally, it should be noted that, the foregoing embodiments are only used to describe the technical solutions of the present invention, instead of limiting the present invention. Under the idea of the present invention, the technical features in the foregoing embodiments or different embodiments may be combined, the steps may be performed in any sequence, and many other changes exist in foregoing different aspects of the present invention. For ease of description, they are not provided in details. Although with reference to the detailed description for the present invention in the foregoing embodiments, a person of ordinary skill in the art should understand that modifications can still be made to the technical solutions of the foregoing embodiments, or equivalent replacements can be made to some of the technical features provided that these modifications or replacements do not cause the essence of the corresponding technical solutions to depart from the scope of the technical solutions of the embodiments of the present invention.

What is claimed is:

1. A remote control, configured to remotely control a movable object, the remote control comprising:
   a body;
   a first rocker device being installed on the body, wherein the first rocker device comprises a first joystick component;
   when the first joystick component moves in parallel relative to the body, the processor generates a remote control instruction used to control the movable object to move in a horizontal plane of the movable object;
   wherein when the first joystick component moves in parallel relative to the body, the first joystick component does not rotate, any two points on the first joystick component move in a same direction and move by a same distance.

2. The remote control according to claim 1, wherein the remote control further comprises:
   a signal transmission device, wherein the signal transmission device is connected to the processor, and configured to receive the remote control instruction generated by the processor, and send the remote control instruction to the movable object.

3. The remote control according to claim 1, wherein the remote control instruction is configured to control the movable object to move in the horizontal plane along a direction corresponding to the direction in which the first joystick component moves.

4. The remote control according to claim 1, wherein the first rocker device further comprises:
   a first shell, wherein the first shell is fixedly installed on the body of the remote control, and when the first joystick component moves in parallel relative to the body, the first joystick component also moves in parallel relative to the first shell;
   a first magnetic element, wherein the first magnetic element is installed on the first joystick component; and a first circuit board, comprising a first magnetic sensor, wherein the first magnetic sensor is configured to sense a magnetic field change of the first magnetic element, wherein
   when the first joystick component moves in parallel relative to the first shell, the first magnetic element is driven by the first joystick component to move relative to the first magnetic sensor in a plane along any direction.

5. The remote control according to claim 4, wherein the first joystick component and the plane intersect.

6. The remote control according to claim 4, wherein the first magnetic sensor sends information indicating the magnetic field change to the processor, and the processor generates the remote control instruction according to the magnetic field change.

7. The remote control according to claim 4, wherein the first shell is fixedly installed on the body of the remote control by using screws.

8. The remote control according to claim 4, wherein the first magnetic element is fixedly installed on the first joystick component, and when the first joystick component moves in parallel relative to the first shell, the first magnetic element moves in parallel relative to the first magnetic sensor.

9. The remote control according to of claim 1, wherein the first rocker device further comprises a restoring mechanism, wherein when the first joystick component is deviated from an initial position, the restoring mechanism generates a force that restores the first joystick component to the initial position.

10. The remote control according to claim 9, wherein the restoring mechanism comprises a first restoring component and a second restoring component, wherein
    when the first joystick component is deviated from the initial position, the first restoring component and the second restoring component generate a composite force that restores the first joystick component to the initial position.

11. The remote control according to claim 10,
    wherein the first restoring component can generate a force that pushes the first joystick component along a first axis, and the second restoring component can generate a force that pushes the first joystick component along a second axis; and
    when the first joystick component is deviated from the initial position, at least one of the first restoring component and the second restoring component generates a force that pushes the first joystick component along a corresponding axis, so that after the first joystick component is loosened, the first joystick component is restored to the initial position, wherein
    the first axis is not parallel to the second axis.

12. The remote control according to claim 1, wherein the first axis is perpendicular to the second axis.

13. The remote control according to claim 11, wherein the remote control further comprises:
    a second rocker device, installed on the body and connected to the processor, wherein the second rocker device comprises a second joystick component, and the second joystick component can move relative to the body, wherein
    when the second joystick component moves relative to the body, the processor generates a remote control instruction used to control the movable object to move correspondingly.

14. The remote control according to claim 13, wherein when the second joystick component moves relative to the body, the remote control instruction generated by the processor is configured to control the movable object to move upward or move downward in a vertical direction, or rotate along a clockwise direction or an anticlockwise direction in a horizontal plane.

15. The remote control according to claim 13, wherein the second joystick component swings or rotates or moves in parallel or move straightly relative to the body.

16. The remote control according to claim 13,
wherein the second rocker device further comprises, a third restoring component, a second magnetic element, a second circuit board, a fourth restoring component, a third magnetic element, a third circuit board, and the third restoring component, the second magnetic element, the second circuit board, the fourth restoring component, the third magnetic element are accommodated in a second cavity, the second joystick component is partly accommodated in the second cavity.

17. The remote control according to claim 16,
wherein the second magnetic element is deposed on the second joystick component, and the second magnetic element moves straightly relative to the second joystick along a first direction or a second direction.

18. The remote control according to claim 17,
wherein the second magnetic element moves, the processor generates the remote control instruction used to control the movable object to move upward or move downward in a vertical direction.

19. The remote control according to claim 15,
when the second joystick component rotates relative to the body, the processor generates a remote control instruction used to control the movable object to rotate along a clockwise direction or an anticlockwise direction in a horizontal plane.

* * * * *